US005566004A

United States Patent [19]

Imaizumi et al.

[11] Patent Number: 5,566,004
[45] Date of Patent: Oct. 15, 1996

[54] IMAGE EDITING APPARATUS HAVING FUNCTION OF DISPLAYING POSITION RELATION BETWEEN IMAGE AND SHEET ON WHICH IMAGE IS FORMED

[75] Inventors: Shoji Imaizumi, Shinshiro; Kenichi Muroki; Keiji Kusumoto, both of Toyokawa, all of Japan

[73] Assignee: Minolta Camera Kabushiki Kaisha, Osaka, Japan

[21] Appl. No.: 450,270

[22] Filed: May 25, 1995

Related U.S. Application Data

[63] Continuation of Ser. No. 995,052, Dec. 22, 1992, abandoned.

[30] Foreign Application Priority Data

Dec. 26, 1991 [JP] Japan .................................. 3-344485

[51] Int. Cl.⁶ .............................. H04N 1/40; H04N 1/387
[52] U.S. Cl. .............................................. 358/450; 358/449
[58] Field of Search ...................................... 358/401, 406, 358/449, 451, 452, 453, 471, 87, 88, 75, 448, 450, 540; 382/47; 395/146, 147, 148, 156; 355/77, 55, 204

[56] References Cited

U.S. PATENT DOCUMENTS

| 3,659,939 | 5/1972 | Hobrough | 250/558 |
|---|---|---|---|
| 4,439,790 | 3/1984 | Yoshida | 358/449 |
| 4,673,988 | 6/1987 | Jansson | 358/453 |
| 4,733,304 | 3/1988 | Homma et al. | 358/452 |
| 4,853,752 | 8/1989 | Takahashi | 355/55 |
| 4,875,173 | 10/1989 | Nakajima | 364/518 |
| 4,947,269 | 8/1990 | Yamada | 358/448 |
| 5,051,927 | 9/1991 | Tada et al. | 382/47 |
| 5,124,799 | 6/1992 | Tsuboi et al. | 358/296 |
| 5,224,181 | 6/1993 | Tsutsumi | 382/284 |
| 5,311,259 | 5/1994 | Moriya et al. | 355/243 |

FOREIGN PATENT DOCUMENTS 2173972A  10/1986  United Kingdom ........... H04N 1/393

*Primary Examiner*—Edward L. Coles, Sr.
*Assistant Examiner*—Jerome Grant, II
*Attorney, Agent, or Firm*—Brinks Hofer Gilson & Lione

[57] ABSTRACT

An image editing apparatus used as a film scanner for reading the image of a photo film and outputting an image signal has a display unit for displaying an input image on its picture frame and can output image signals for showing all or a part of the input image on a plurality of paper sheets. An image editing apparatus can display on the picture frame of the display unit, the image of the sheet and an image representing the position of an image to be stored onto the sheet.

18 Claims, 26 Drawing Sheets

5,566,004

IMAGE EDITING APPARATUS HAVING FUNCTION OF DISPLAYING POSITION RELATION BETWEEN IMAGE AND SHEET ON WHICH IMAGE IS FORMED

This application is a continuation of application Ser. No. 07/995,052, filed Dec. 22, 1992 now abandoned.

BACKGROUND OF THE INVENTION

Field of the Invention

The present invention relates generally to image editing apparatuses, and more specifically, to an image editing apparatus used with an image forming apparatus having a function of enlarging an image by continuously printing the same on a number of sheets of paper.

Description of the Related Art

An image processing method of interest to the present invention is disclosed, for example, in U.S. Pat. No. 4,853,752. According to the document, an enlarged image of an original is reproduced by enlarge-processing image data of divisional areas of the original image and sequentially printing out the image data.

According to a conventional image processing method, an operator cannot be sure about how a designated original image is divided into a plurality sheets of paper and sometimes realizes the reproduced image is different from what he/she desires it to be only after a hard copy is produced. As a result, a miscopy is formed. Therefore, not only time and labor are wasted, but also cost generated by a number of miscopies cannot be ignored, particularly when a full color copier is utilized, for a high unit price per sheet of copy image.

According to a conventional image forming method, there is a possibility that a small part of the periphery of an output image (hard copy image) goes out of a copy sheet and formed at a rim of another copy sheet. In such a case, the number of forming a hard copy image may be greatly reduced for saving cost by setting the size of an output image to be a little smaller.

Particularly when an enlarging by continuous printing is performed on a trimming image, since it is not easy to confirm only the trimmed image, and therefore it is not easy to imagine how a hard copy image by enlarging by continuous printing is turned out to be. As a result, erroneous operations, the above-stated waste and the like are likely to occur due to the complicated setting and designating methods required for enlarging the image.

Further, an important part of an image is sometimes formed in the boundary region between sheets of paper, and the resultant image as a whole might give an undesirable impression.

Furthermore, when one sheet among a plurality of sheets with a hard copy image formed thereon by enlarging by continuous printing is damaged or lost, the hard copy image must be once again formed for all the sheets, which results in waste of time, labor and resources.

SUMMARY OF THE INVENTION

It is therefore an object of the present invention to prevent miscopying from being made in an image forming apparatus allowing enlarging by continuous printing.

Another object of the invention is to prevent a key part of an image from being formed in the boundary portion between copy sheets in an image forming apparatus allowing enlarging by continuous printing.

A still further object of the invention is to provide a method of forming an enlarged image on a plurality of sheets without miscopying.

Yet another object of the invention is to prevent a key part of an image from being formed in the boundary portion of copy sheets in a method of forming an enlarged image on a plurality sheets of paper.

The above-stated objects of the invention are achieved by displaying how the state of an enlarged image will be if they are printed on a plurality of sheets sequentially arranged. How the state of the image will be printed on the plurality of sheets is displayed, and an operator can therefore check how the image will be printed on the sheets with his/her eyes. Consequently miscopying can be prevented in the image forming apparatus allowing enlarging by continuous printing.

The foregoing and other objects, features, aspects and advantages of the present invention will become more apparent from the following detailed description of the present invention when taken in conjunction with the accompanying drawings. BRIEF DESCRIPTION OF THE DRAWINGS FIG. 1 is a front view showing an over view of a film scanner in accordance with the present invention;

DESCRIPTION OF THE PREFERRED EMBODIMENTS

Embodiments of the invention applied to a film scanner will be described in conjunction with the accompanying drawings.

A film scanner is an apparatus for optically reading an original image (hereinafter referred to as film image) from a photo film (hereinafter referred to as film) and outputting the read out image as an image signal, and structured to allow image editing processings such as trimming (extraction of a part of an image), enlarging and reducing of the read out film image or enlargement and reduction by continuously printing the image. Enlarging by continuously printing an image (hereinafter referred to as "enlargement by continuous printing") is a function of outputting one image over a plurality of sheets of paper, while reduction by continuously printing an image (hereinafter referred to as "reduction by continuous printing") is a function of repeating outputting a plurality of identical images on one sheet of paper. Such a film scanner is generally utilized in combination with a color printer, and a hard copy image corresponding to a film image is formed based on an image signal output from the film scanner.

Figure 1:
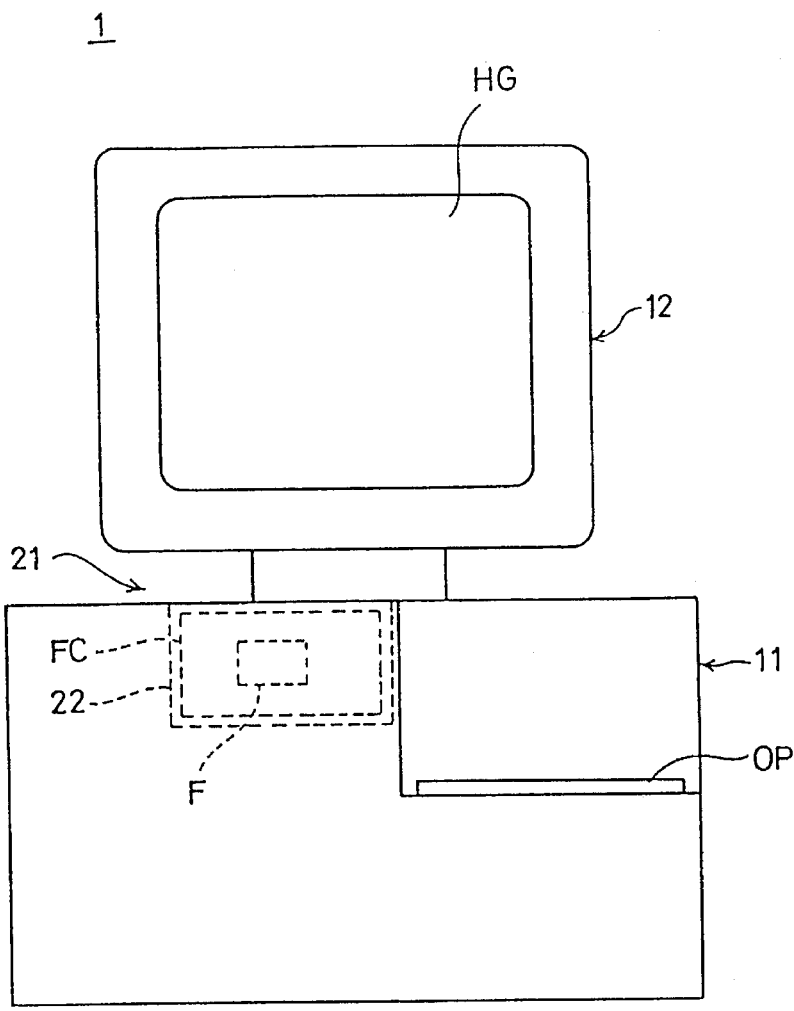

Referring to FIG. 1, film scanner 1 includes a main body 11 having therein an optical system for reading a film image, a control portion for processing image data or the like, and a display unit 12 for displaying the read out image on a picture frame HG. An operation panel OP is provided on the upper surface of main body 11.

In main body 11 at a film mount portion 21 provided in its upper part, a truck 22 laterally movable is disposed, and a film carrier FC with a film F mounted therein is inserted in truck 22.

Figure 2:
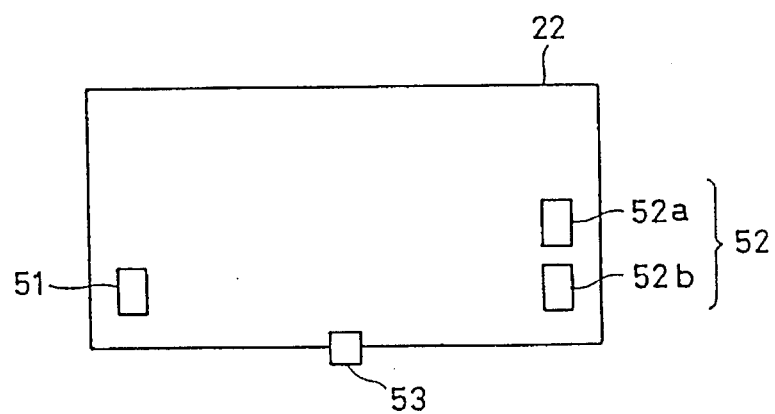
FIG. 2 is a front view showing a truck provided at the main body of a film scanner.

As illustrated in FIG. 2, provided to truck 22 are a carrier detection sensor 51 for detecting the presence/absence of film carrier FC, and kind detection sensors 52a and 52b for detecting the kind of film carrier FC. Also provided to main body 11 is a position detection sensor 53 for detecting the position of film carrier FC by transmitting light through a hole provided at truck 22. A photo sensor of transmitting type is, for example, used for these sensors.

Figure 3:
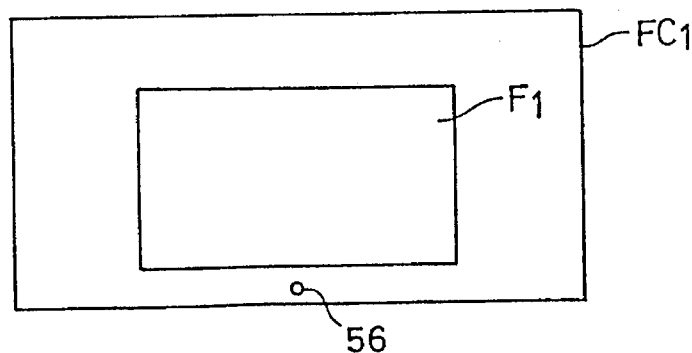
FIGS. 3A–3D are front views showing various film carriers.
Figure 3:
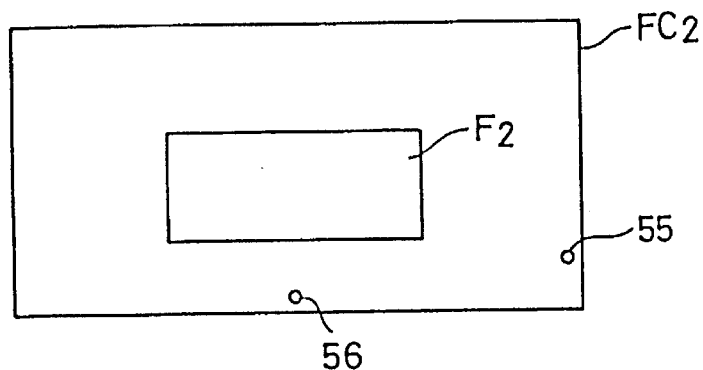
Figure 3:
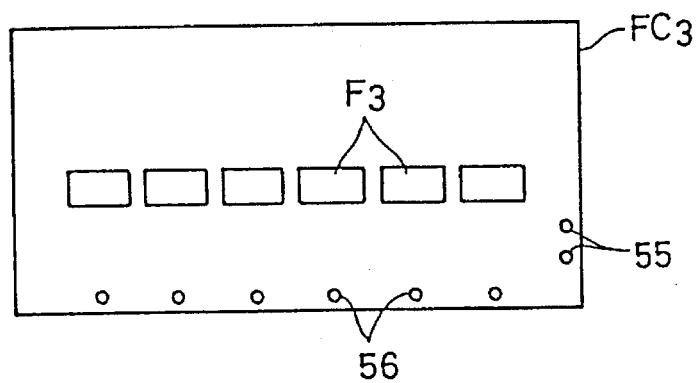
Figure 3:
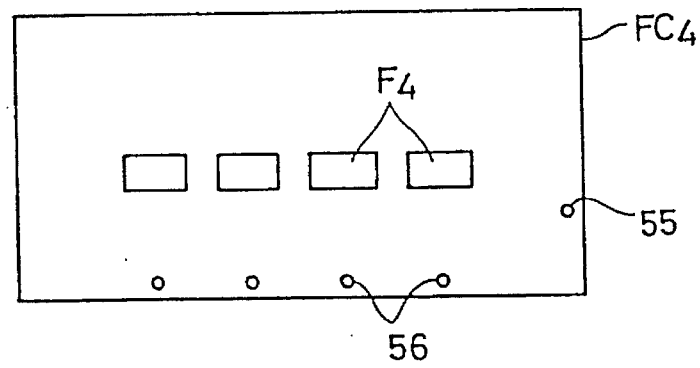

As illustrated in FIG. 3 at (a)–(b), there are four kinds of film carriers FC, a film carrier FC1 for a film F1 of 4×5 inch size, a film carrier FC for a film F2 of 6 cm size, a film carrier FC3 for a sequential film F3 of 35 mm size, and a film carrier FC4 for a mounted film F4 of 35 mm size, and each of them is provided with a kind detection hole 55 for detecting the kind, and a position detection hole 56 for positioning each film F.

Figure 4:
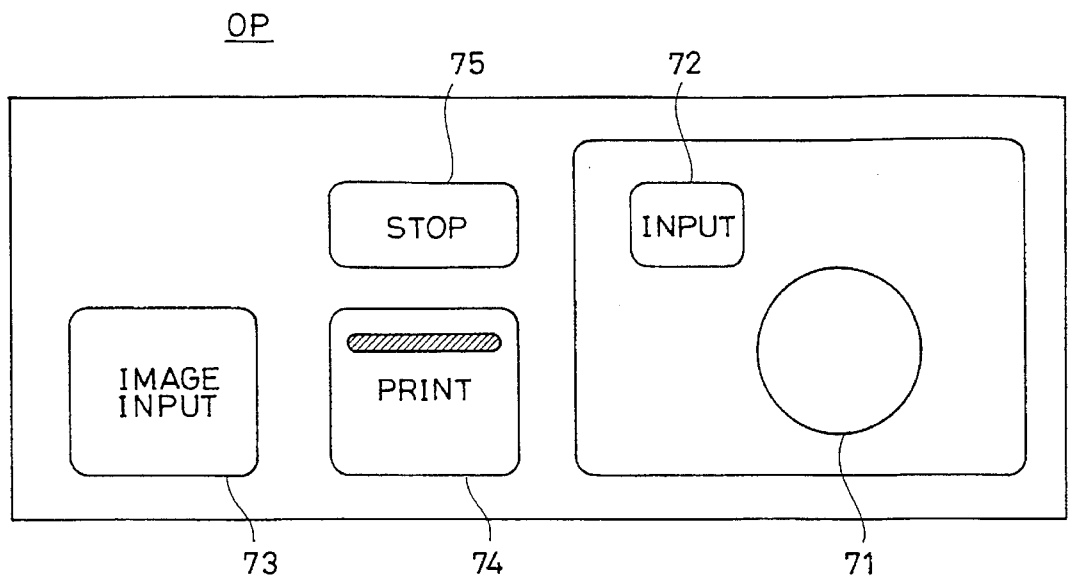
FIG. 4 is a front view showing an operation panel.
Figure 5:
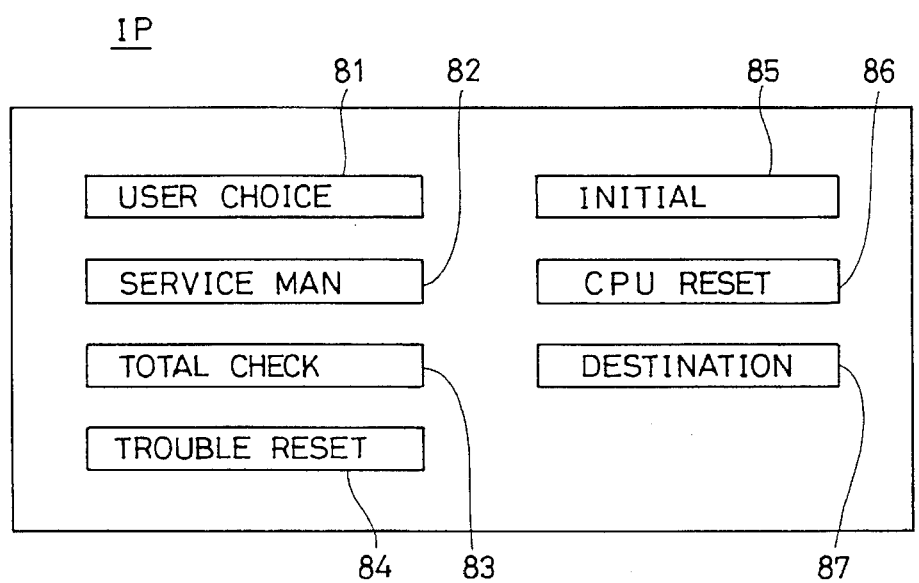
FIG. 5 is a front view showing an internal panel.

As illustrated in FIG. 4, provided on operation panel OP are a truck ball 71 for moving a cursor displayed on picture frame HG, an enter key 72 for inputting a button Z instructed by the cursor, an image input key 73 for reading a film image and letting the image be displayed in picture frame HG, a print key 74 for instructing printing out by an external color printer, and a stop key 75 for stopping an operation such as reading and printing out of an image.

An internal panel IP which can be operated by opening up a cover (not shown) is provided in main body 11.

Provided on internal panel IP are a user choice key 81 for instructing setting of a user choice mode, a service man key 82 for instructing setting of a service man mode, a total check key 83 for instructing display of the total number of sheets printed, a trouble reset key 84 for resetting a trouble state, an initial key 85 for initialization, a CPU reset key 86 for resetting a CPU, and a destination code key 87 indicating a destination.

Figure 6:
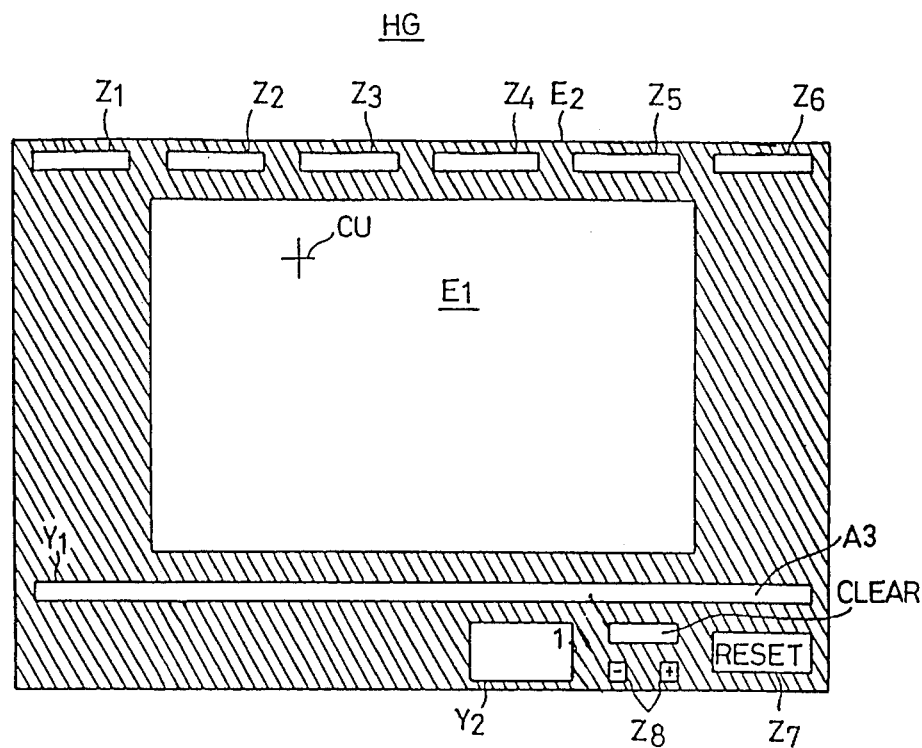
FIGS. 6A & 6B are views showing an example of a displayed image.
Figure 6:
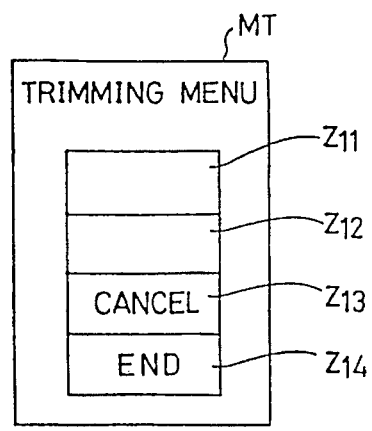

Various buttons Z for operation are displayed in the picture frame HG of display unit 12. Picture frame HG is, as illustrated in FIG. 6 at (a), basically formed of an image display region E1 in the center and a display region for operation E2 in its periphery.

In image display region E1, a blank is displayed in an initialization state after turning on a power supply, and after a film image is read by pressing (on) of image input key 73, the film image or the edited image thereof is displayed. In display region for operation E2, various buttons Z and display portions Y are displayed. Buttons Z and display portions Y shown in FIG. 6A & 6B (a) function as follows.

A sub menu is displayed by an image adjustment button Z1, and an image adjustment such as color balancing can be set. A trimming mode is set by a trimming button Z2. An enlargement by continuous printing mode is set by an enlargement by continuous printing button Z3, and an output size can be set based on the submenu. A reduction by continuous printing mode can be set by a reduction by continuous printing button Z4. A confirmation picture frame for confirming the relation between an image to be printed out and a paper sheet is displayed by an output confirmation button Z5. A submenu for setting a paper size for the printer is displayed by an output size button Z6. A mode presently set is canceled for initialization by a reset button Z7. The number of sheets to be printed (the number of copies) is set by a sheet number setting button Z8.

In the enlargement by continuous printing mode, one film image or the trimmed image thereof is enlarged and printed out into a plurality of sheets of paper, while in the reduction by continuous printing mode, a plurality of film images or the trimmed images thereof are printed out side by side in one sheet of paper.

At a message display portion Y1, the kind of a mounted film F, the size of a print out sheet, and other messages are displayed. The number of sheets printed is displayed at a sheet number display portion Y2.

A button Z by a submenu shown in FIGS. 6A, 6B at (b) is sometimes displayed in the blank in the right in display region for operation E2. Buttons Z11–Z14 will be described later.

In picture frame HG, a cursor CU together with images and buttons Z is displayed. An operator moves cursor CU to an arbitrary position in picture frame HG using truck ball 71 on operation panel OP, and designates the position by turning on enter key 72 to input buttons Z or set a position and a region for an image.

Though not illustrated in the drawings, the optical system built in main body 11 includes a lamp unit having a halogen lamp, a plurality of mirrors moving in a subscanning direction for scanning, a fixed mirror, a lens, an optical filter, and a one dimensional image sensor IS of a CCD array for color-separation of a film image into three colors R, G, and B and reading.

Figure 7:
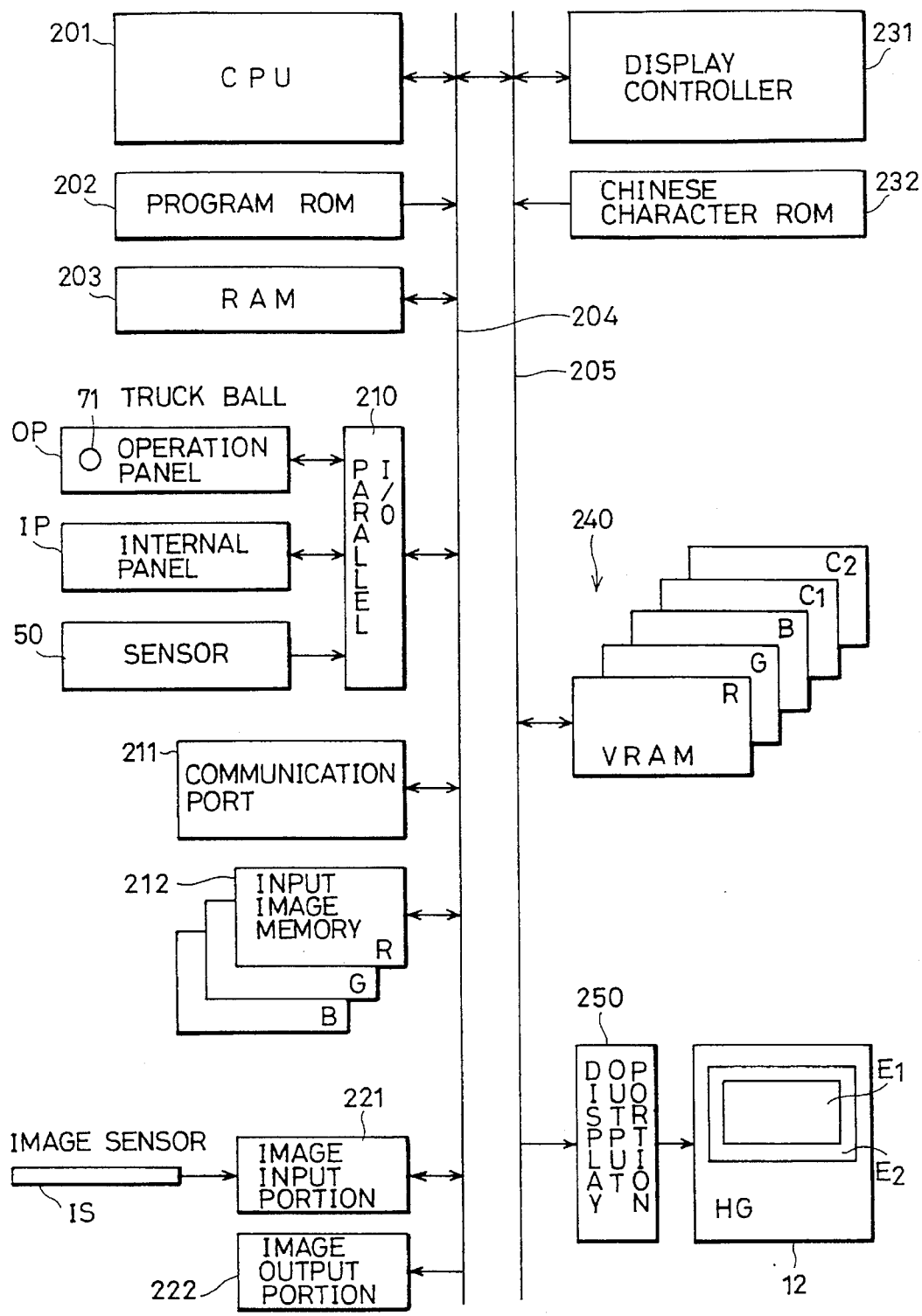
FIG. 7 is a block diagram showing the structure of the control portion of a film scanner.

FIG. 7 is a block diagram showing the structure of a control portion 200 in film scanner 1.

Control portion 200 includes a CPU 201 for controlling the entire film scanner 1, and a display controller (AGDC) 231 for making control for an image to be displayed by display unit 12.

Connected to CPU 201 through a CPU data bus 204 are a program ROM 202 which stores programs for control, an RAM 203 for temporarily storing variables and other data necessary for executing the programs, an input/output interface 210 for input/output of signals, a communication port 211 for communication with the printer, an image input portion 221 for an input processing of an image signal read by image sensor IS, an input image memory 212 for storing image data input at image input portion 221, an image output portion 222 for an editing processing of image data for print out, and the like.

Operation panel OP, internal panel IP, and various sensors 50 together with driving circuits each for the motor, the filter, the lens, and the mirrors, a lamp control circuit and other circuits are connected to input/output interface 210.

Connected to display controller 231 through AGDC data bus 205 are a Chinese character ROM 232, a VRAM (video RAM) 240, and a display output portion 250 for an editing processing to display image data stored in VRAM 240 to display unit 12.

VRAM 240 has five planes all together, three image planes for image data of respective colors R, G, and B color-separated, and two character frames C1, C2 for moving display elements such as the cursor in the trimming plane.

Image data stored in image memory 212 is transferred and stored to the image planes for the R, G, and B of VRAM 240 by the control of display controller 231, and at that time, the image data is partially cut out, enlarged or reduced in response to an instruction from CPU 201.

Figure 8:
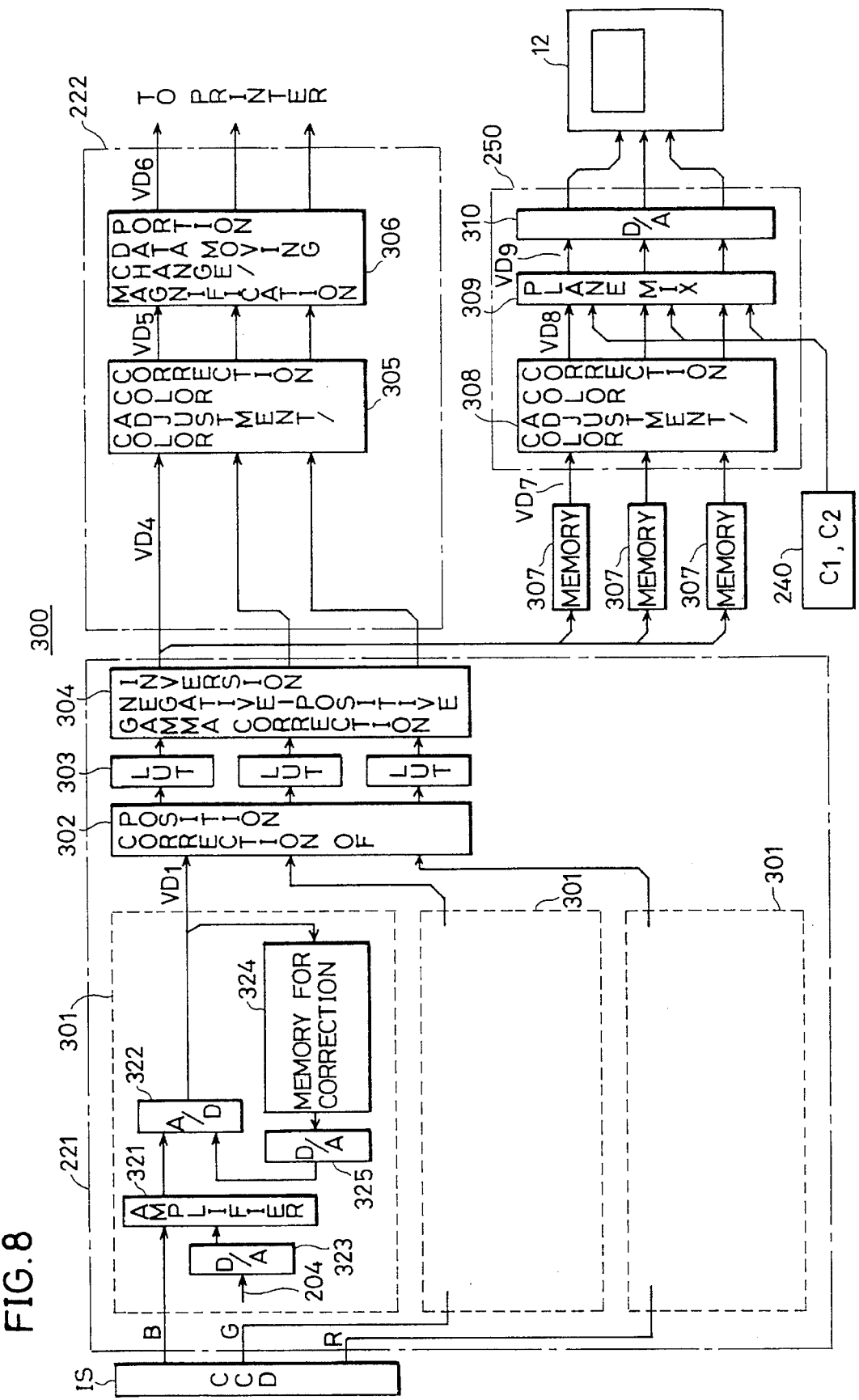
FIG. 8 is a block diagram showing the image processing portion of the control portion along the flow of data.

FIG. 8 is a block diagram showing an image processing portion 300 in control portion 200 along the flow of data.

Image processing portion 300 includes image input portion 221, image output portion 222, display output portion 250 and memory 307 stated above.

Image input portion 221 has an amplification conversion portion 301, a position correction portion 302, a look up table 303, and a gamma correction portion 304 to an image signal for each of the colors R, G, and B.

Amplification conversion portion 301 has a video amplifier 321 having its amplification factor set by a voltage signal output from a DA converter 323, an AD converter 322 converting the signal into image data by quantization, a DA converter 325 for applying a reference voltage to AD converter 322, and a memory for correction 324 for outputting data for shading correction to DA converter 325 in synchronization with a pixel clock.

In DA converter 323, data concerning the amplification factors is input from CPU 201 through CPU data bus 204. With the amplification factor being set to a prescribed value as this data, based on a prescribed number of pieces of image data read by pre-scanning, a maximum value and a minimum value for each of the color components R, G and B are extracted in advance, the amplification factor is produced in such a way that the maximum value takes the prescribed value and the resultant amplification factor is set. Differences in sensitivity and exposure condition between the colors R, G and B due to differences in the kinds of films F can be corrected by video amplifier 321.

Position correction portion 302 corrects the difference between the positions of R, G, and B of image sensor IS. More specifically, since in image sensor IS, pixel columns for one line of each of the colors R, G, and B are placed in parallel with each other at prescribed intervals, image data is delayed by the amount corresponding to the interval for positioning.

Data is written from CPU 201 in look up table 303 through CPU data bus 204, and a normalization processing is performed so as to make the amplitude of output data relative to input data constant. Correction of the difference in the kinds and exposure conditions of films F can be made without a special memory by synchronizing the processing with the above-stated operation of video amplifier 321. Such correction is controlled by CPU 201 so that it is not performed in the case of positive films and even in the case of a negative film, if the maximum values and the minimum values of R, G and B are beyond a prescribed range.

Gamma correction portion 304 performs data correction processing to cope with the difference between a negative film and a positive film, gamma correction processing and negative-positive inverting processing. Image data VD4 output from gamma correction portion 304 is input into image output portion 222 and memory 307.

In image output portion 222, the result of color adjustment processing utilizing a color CRT is fed back and a correction processing for matching image data for output to the printer is performed, while magnification changing/data moving portion 306 subjects image data to an electrical magnification changing processing in a main scanning direction and a data moving processing.

Memory 307 is formed by combination of input image memory 212, VRAM 240 and display controller 231 for data transfer between these elements. More specifically, the image data VD4 output from image input portion 221 is first stored in input image memory 212 as it is. The image data stored in input image memory 212 is held in tact until the next new image is read by image sensor IS. A part of or the whole image data stored in input image memory 212 is enlarged or reduced at an appropriate magnification for transfer to VRAM 240 based on the content of an editing processing such as trimming, changing magnification, moving data, and then the transferred data is read out as needed and output to display output portion 250 as image data VD7.

In display output portion 250, the result of a color adjustment processing utilizing the color CRT is fed back by color adjustment portion 308. A correction processing for matching image data to be output to display unit 12, a processing of combining image data of the plans of VRAM 240, then the resultant combined data is converted into an analog signal by DA converter 310 and a video signal for each of the colors R, G and B is output to display unit 12.

Figure 9:
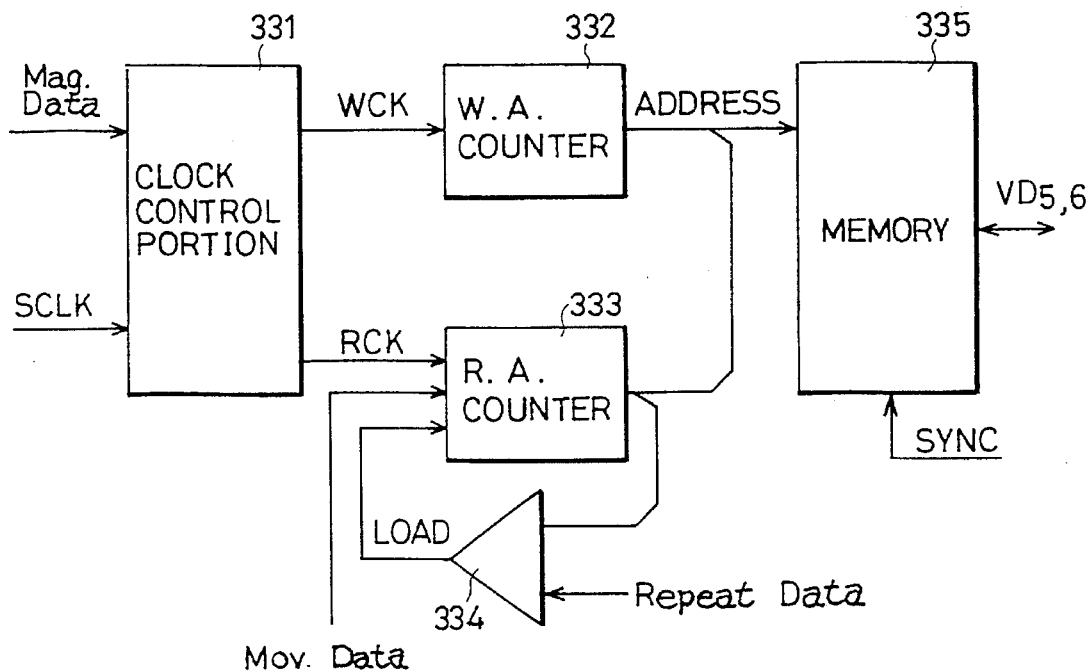
FIG. 9 is a diagram showing an example of the circuit of a magnification changing/data moving portion in an image processing portions.
Figure 10:
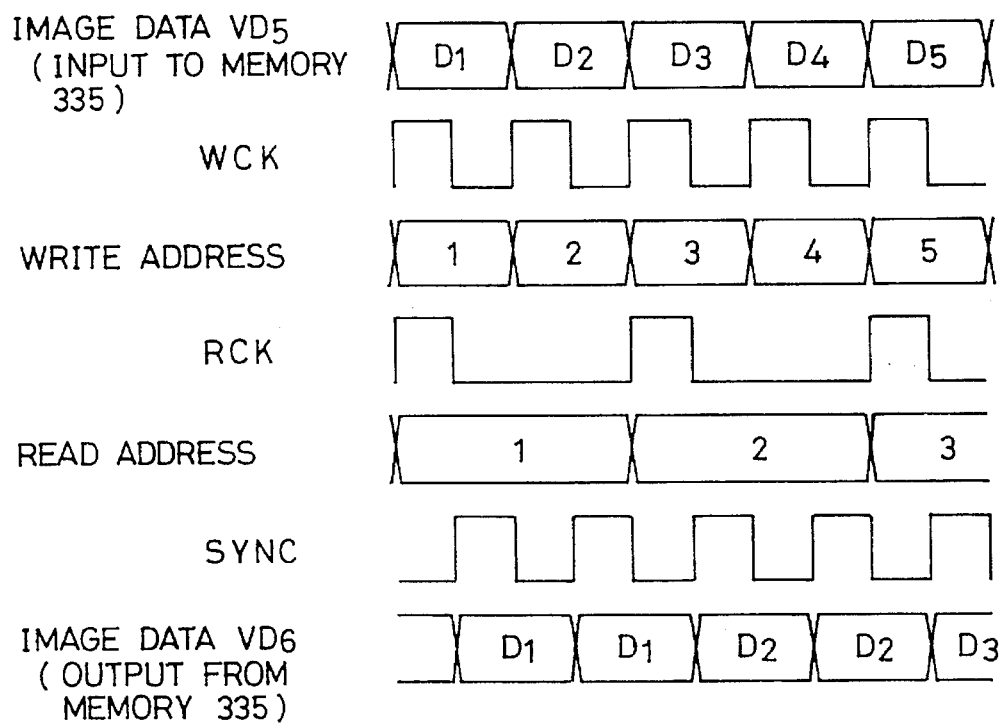
FIG. 10 is a timing chart for use in illustration of states of signals when an image is enlarged by a magnification/data changing portion.
Figure 12:
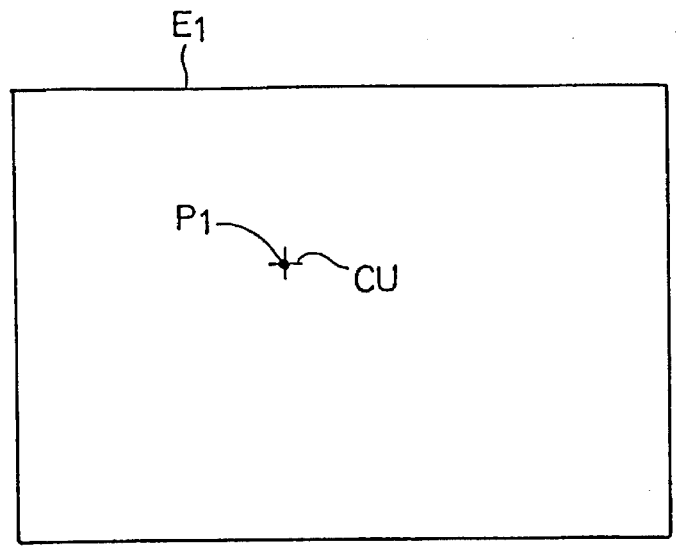
FIGS. 12A & 12B are representations showing a procedure of designating a frame for trimming.
Figure 12:
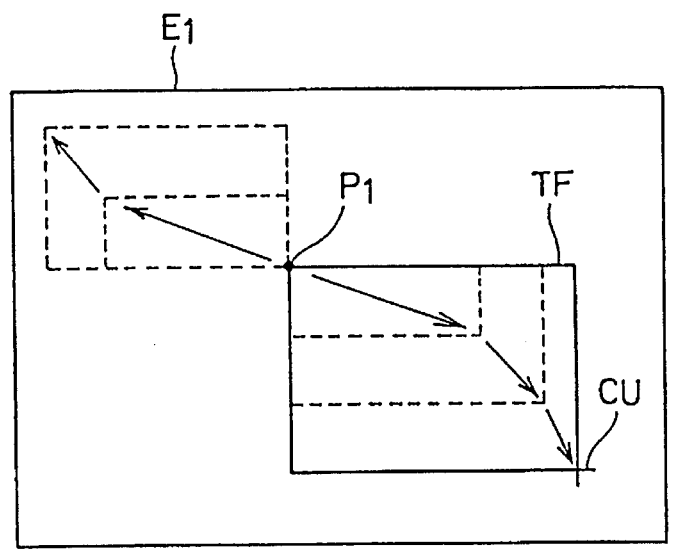

FIG. 9 is a diagram showing an example of magnification changing/data moving portion 306 in image processing portion 300, FIG. 10 is a timing chart for use in illustration of signals states when data is enlarged by magnification changing/data moving portion 306 and FIG. 12 is a timing chart for use in illustration of signal state when data is reduced by magnification changing/data moving portion 306.

Magnification changing/data moving portion 306 includes a memory 335 to which the image data VD5 is written and from which the image data VD6 is read out, a write address counter 332 for generating an address when writing to memory 335, a read address counter 333 for generating an address when reading from memory 335, a comparison portion 334, and a clock control portion 331. The image data VD6 is read out from memory 335 in synchronization with a pixel clock SYNC.

Clock control portion 331 generates a clock signal WCK for writing and a clock signal RCK for reading in response to a reference clock signal SCLK and a magnification data signal (Mag Data) input from CPU 201.

Write address counter 332 upon writing counts the clock signal WCK for writing with "0" as an initial value, and outputs the count value as an address. Read address counter 333 upon reading counts the clock signal RCK for reading with the value of moving data (Mov. Data) and outputs the count value as an address.

When data is enlarged, as illustrated in FIG. 10, the cycle of clock signal ICK for reading gets longer in accordance with the magnification (enlarging magnification), whereby change in the address value when reading is delayed, the same data is read out from memory 335 a number of times in synchronization with the pixel clock signal SYNCK and an enlargement processing is performed. In the case shown in FIG. 10, the data is enlarged twice as large as the original.

Figure 11:
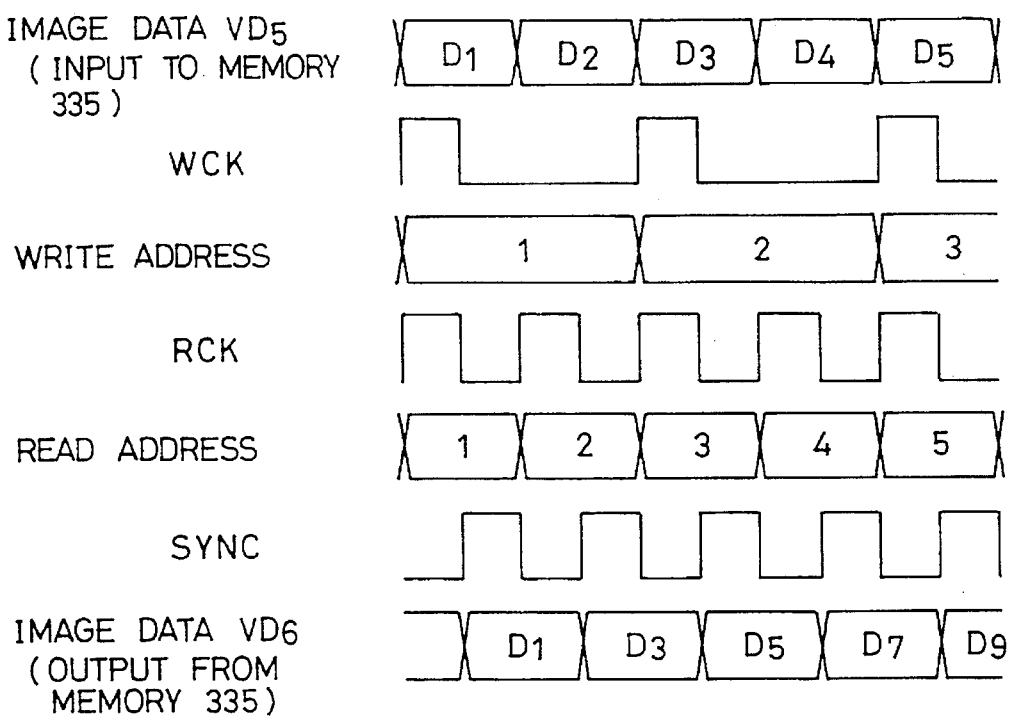
FIG. 11 is a timing chart for use in illustration of state signals when an image is reduced by a magnification changing/data moving portion.

When data is reduced, as illustrated in FIG. 11, the cycle of the clock signal WCK for writing gets longer in accordance with the magnification (reducing magnification), whereby change in the address value when writing is delayed, and image data is thinned out to be written in memory 335. Since the thinned out image data is read out in response to the pixel clock signal SYNC, a reducing processing is performed. In the example shown in FIG. 11, data is reduced to ½ the original.

The read address output from read address counter 333 begins from the value of data to be moved which is input thereto, and, therefore, the image moves laterally in accordance with the value of data to be moved. It is noted that when read address counter 333 conducts a subtraction operation by the clock signal RCK, a mirror image relative to the original image is provided.

When Repeat Data is input, if the count value reaches the value of the repeat data, a re-count signal (Load) is output from comparison portion 334, and move data is set as an initial value for read address counter 333, thereby resuming counting from that value. Thus, the address from the value of move data to the value of repeat data is repeatedly output, and data stored in that address is repeatedly read out from memory 335. This operation is performed when reducing data by continuous printing.

Now, a description of a basic operation of film scanner 1 structured in the above-manner follows. When a film image is simply printed out, print key 74 is turned on after mounting a film F. Thus, the film image is read out, and image information corresponding to the film image is output to an external printer. In this case, the read out image is not displayed.

When an output image is monitored prior to printing out operation or when an image editing operation such as trimming, enlarging by continuous printing, reducing by continuous printing or adjustment of tone, image input key 73 is turned on after a film F is mounted. Thus, the film image is read, and the read image is displayed in the picture frame HG of display unit 12. After an operation for setting an image editing operation or the like while observing the displayed image, when print key 74 is turned on, the film image is read from the beginning and the set editing processing is conducted to the read image data for printing out.

It is noted that in film scanner 1 in accordance with this embodiment, when cursor CU is within the image display region E1, a trimming mode is set as in a similar manner as when trimming button Z2 is input. More specifically, simply moving cursor CU within image display region E1, the trimming mode is automatically set allowing a trimming region to be set, while moving cursor CU outside the image display region E1 (in other words to display region for operation E2), the trimming mode is canceled, allowing selection of each button Z.

Cursor CU is displayed in a form for the trimming mode such as a cross within the image display region E1, and in a form of arrow for mode selection within the display region for operation E2. Thus, the operator can readily recognize whether it is the trimming mode or not.

Now, an operation procedure related to the trimming mode will be described.

When the operator desires to trim a film image, he/she designates a region to be trimmed by designating two points utilizing truck ball 71 and enter key 72, after making the film image be displayed in the image display region E1 in the picture frame HG as described above.

More specifically, as illustrated in FIGS. 12A & 12B at (a), enter key 72 is turned on by moving cursor CU to point P1 which is one corner point in the region to be trimmed. Thereafter, as illustrated in FIG. 12 at (b), a square trimming frame TF with the line connecting point P1 and the position of the cursor being diagonal is displayed by moving the cursor CU. The trimming frame TF changes its form in accordance with the movement of the cursor CU.

Enter key 72 is turned on with the trimming frame TF in agreement with a region desired to be trimmed. Thus, the region delineated by the trimming frame TF is designated as the region to be trimmed.

Then, if one desires to change the position of the trimming region, enter key 72 is turned on with the cursor CU being displayed within the trimming frame TF. This permits the movement of the trimming frame TF, and the trimming frame TF moves following the cursor CU without deforming by operation of truck ball 71. The operator moves the trimming frame TF as needed, thereby deciding the region to be trimmed at an arbitrarily position.

When the region to be trimmed is decided, output confirmation button Z5 is input to switch to an output confirmation mode, in order to confirm the trimmed image. Then, data in the portion corresponding to the trimmed region among image data stored in input image memory 212 is transferred to VRAM 240, which is displayed in picture frame HG.

At that time, if, for example, a normal copy image display is made, a designated output paper is displayed in white within the image display region E1 of picture frame HG, and the trimmed image is displayed in the center of the paper. If the paper is of a commercially available regular size, the trimmed image is automatically enlarged so as to be displayed at maximum within the sheet of paper. Accordingly, when the size of a region to be trimmed is changed, the magnification M is automatically changed. If the paper size is changed, the magnification M and the size of the trimmed image are automatically changed in accordance with the change. It is noted that if an output size or the magnification M for the trimmed image is designated, the resultant image is displayed in a corresponding size.

In film scanner 1 in accordance with the present embodiment, a film image read by image sensor IS has 4096 dots vertically (main scanning direction) and 6144 dots laterally (subscanning direction) regardless of the kind of a film, and its aspect ratio is 1:1.5. Meanwhile, since the aspect ratio of a commercially available regular sheet is 1:1.41, only the part of the film image corresponding to 5792 dots in the center in the lateral direction is printed out with the part corresponding to 172 dots in the lateral direction in the opposing ends being deleted.

As to the magnification M when printing out, an equal scale magnification is provided when electrical change of magnification is not performed, in other words when the pixels of a film image are printed out correspondingly to the dots of the printer on a one-to-one basis. Accordingly, if, for example, a film image is printed out by a printer of 400 dpi at the equal scale magnification, an image of about 260×368 mm is produced irrespective of the kind (size) of a film used. It is noted that the magnification of the optical system can vary according to the kind of the film.

Meanwhile, the magnification for display into picture frame HG (display magnification:Mdisp) is represented by the ratio (dots/mm) of the size of a sheet relative to the number of pixels (dots) in picture frame HG.

Figure 13:
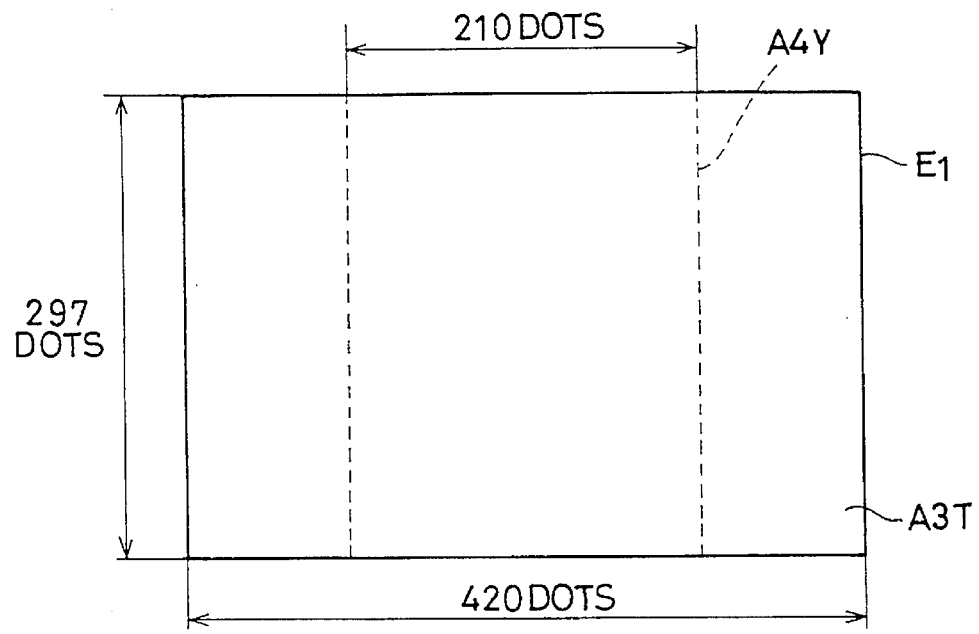
FIG. 13 is a representation showing pixel arrangement in an image display region in a picture frame.

More specifically, as illustrated in FIG. 13, the display magnification Mdisp is decided so that the pixel arrangement of 297 dots vertically and 420 dots laterally in the image display region E1 in picture frame HG, basically with a pixel (one dot) in picture frame HG corresponding to 1 mm in a sheet. Therefore, if the display magnification Mdisp is the equal scale magnification, a sheet of vertical 297 mm and lateral 420 mm is displayed in the image display region E1, which means that a commercially available regular sheet of A3T is fully displayed in the image display region E1 (T indicates vertical placement, in other words that the longitudinal direction of the sheet agrees with the subscanning direction, in which case the longitudinal direction of the sheet agrees with the lateral direction of picture frame HG.)

Accordingly, if the size of an output paper sheet is A3T, in other words if the display magnification Mdisp is the equal scale magnification, since a film image read out by 4096×6144 dots is displayed in picture frame HG in 297×420 dots, the image data is therefore reduced to 297/4096 when it is transferred from input image memory 212 to VRAM 240.

As to the longitudinal sheets other than A3T, the display magnification Mdisp =(A3T sheet size/selected sheet size). For example, if a sheet of A1T is displayed in the image display region E1, the display magnification Mdisp will be "½".

If an output paper sheet is placed in the lateral direction, a regular paper sheet of A4Y (Y indicates lateral placement) is basically used. Therefore, when the display magnification Mdisp is the equal scale magnification, a regular paper sheet of A4Y of vertical 297 mm and lateral 210 mm will be displayed in longitudinal 297 dots and lateral 210 dots in the center of the image display region E1. As to sheets placed in the lateral direction other than A4Y, the display magnification Mdisp =(A4Y sheet size/selected sheet size).

Now, an example of a processing of control portion 200 when trimming is performed will be described.

FIG. 14A–14C are views showing a picture frame G0 for trimming editing and picture frames for confirming G1 and G2.

Coordinates in the image display region E1 in the picture frame HG takes the upper right most end of the image display region E1 as origin (0, 0) and increases by "1" per 1 dot as moving downward (main scanning direction) and leftwards (sub scanning direction). More specifically, the coordinates of the lower left most end in the image display region E1 are (296,419).

As illustrated in picture frame for trimming editing G0 shown in FIG. 14(a), assume that in a film image FI having an A3T size fully displayed in the image display region E1, a trimming frame TF is decided by designating two points, point TP1 (6,133) and point TP2 (212,311), thereby deciding a trimmed image TI0. In this case, the number of dots of the trimmed image TI0 in picture frame HG is 206×178. It is noted that A3T for commercially available regular sheets is designated as the output sheet size.

When output confirmation button Z5 is input to provide an output confirmation mode, confirmation picture frame G1 as shown in FIG. 14(b) is displayed. In confirmation picture frame G1, the trimmed image TI0 is enlarged both in vertical and lateral directions at the rate of 1.44 (=297/206), and displayed fully in the vertical direction of image display region E1 as a trimmed image TI1, while the portion of the opposite sides other than the trimmed image TI1 in image display region E1 is displayed as a white sheet.

Since the state displayed in confirmation picture frame G1 exactly represents actual relation between the paper sheet and the image when the image is printed out by turning out print key 74, the operator can confirm whether or not a hard copy image just as he/she desires it to be can be obtained. As a result, misprinting can be prevented.

If the size of the trimmed image TI1 to be printed out is directly designated, the trimmed image TI1 of the designated size is displayed in the center of the image display region E1 in confirmation picture frame G1, and printing is performed in the displayed state.

Even if the size or position of the trimmed image TI1 is desired to be changed with confirmation picture frame G1 being displayed, a re-trimming processing mode is attained by turning on enter key 72, the original image shown in FIG. 14(a) is displayed in picture frame HG, and trimming frame TF0 can be moved or changed in that picture frame HG. Thereafter, confirmation picture frame G1 is displayed as a re-output confirmation mode and trimming just as described by the operator can readily be performed without any mistakes by repeating these operations.

Figure 14:
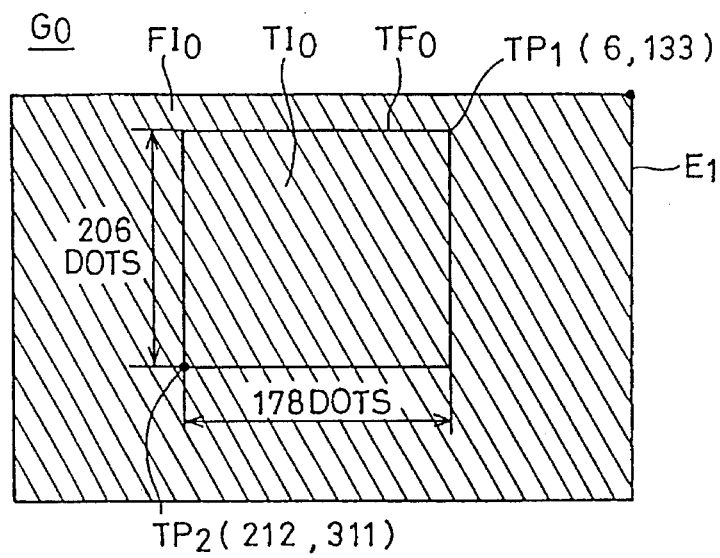
FIGS. 14A–14C are representations showing a picture frame for trimming-editing and a picture for confirmation.
Figure 14:
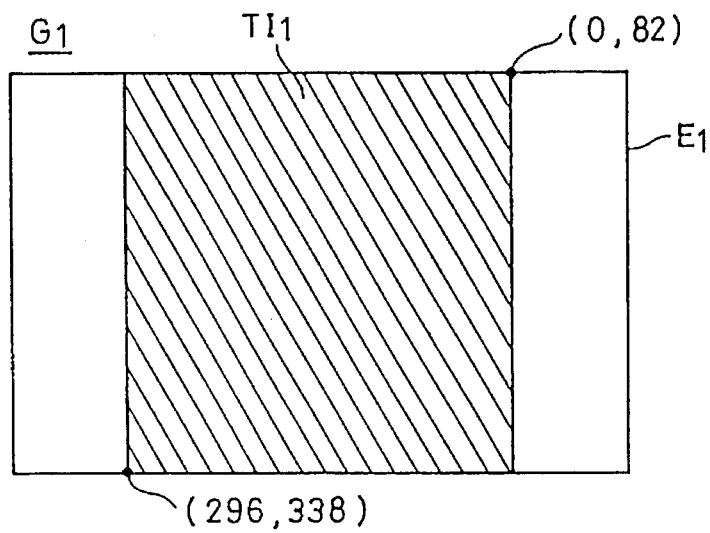
Figure 14:
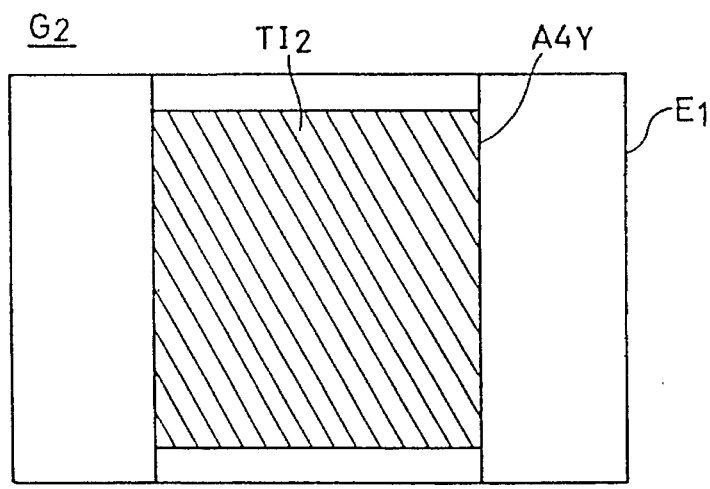

The two points, point TP1 (6,133) and point TP2 (212, 311) originally designated in picture frame HG as shown in FIG. 14 at (a) correspond to point [83 (=6×4096/297), 2006 (=172+133×4096/297)] and point [2924 (=212×4096/297), 4461 (=172+311×4096/297)] in the film image FI0 as read from the film, considering 172 dots each in the opposite ends in the lateral direction are deleted. 1 dot in picture frame HG corresponds to about 16 dots in a printer of 400 dpi (about 16 dots/mm). Accordingly, the two points (0, 82) and (296,338) of the trimmed image TI1 in confirmation picture frame G1 shown in FIG. 14(b) correspond to points (0, 1312) and (4752, 5408) when they are displayed in dot in an A3T sheet.

Therefore, the magnification changing/data moving portion 306 of image output portion 22 performs the following processing in order to print out thus trimmed image TI1 on an A3T sheet. More specifically, the first 1311 lines (1 line corresponds to a pixel column in the vertical direction of a film image) output "white" data, data of 83–2924 dots in the 2006-th line of the image data VD5 of the read film image has its magnification electrically changed to 1.67 [=4752/ (2924−83)] in the vertical direction for output as data in the 1312nd line, data in the 1313rd–5408-th lines has its magnification changed to 1.67 in the vertical and lateral directions (main and sub scanning directions) for output and from the 5409-th line and on, "white" data is output.

As illustrated in FIG. 14(a), the trimmed image TI0 is decided, and if a regular sheet of A4Y is designated for an output sheet, an enlarged trimmed image TI2 is displayed in the center in the region for A4Y sheet in image display region E1 as illustrated in FIG. 14 (c).

The trimmed image TI0 can be laid out in an arbitrary position in the sheet and printed out by freely moving the image within the range of the output paper, and the state of layout can be displayed in picture frame HG.

When enlargement by continuous printing button Z3 is input, an enlargement by continuous printing mode is attained. In this enlargement by continuous printing mode, one original image is enlarged and divided into a plurality of pieces for output, and one hard copy image enlarged over a plurality of paper sheets [an image LI enlarged by continuous printing, see FIG. 16 (c)] can be provided. In the enlargement by continuous printing mode, the size and number of output sheets and magnification M are calculated based on a previously designated original image and an output image size (the size of the image LI) set in a submenu which will be described below.

Figure 15:
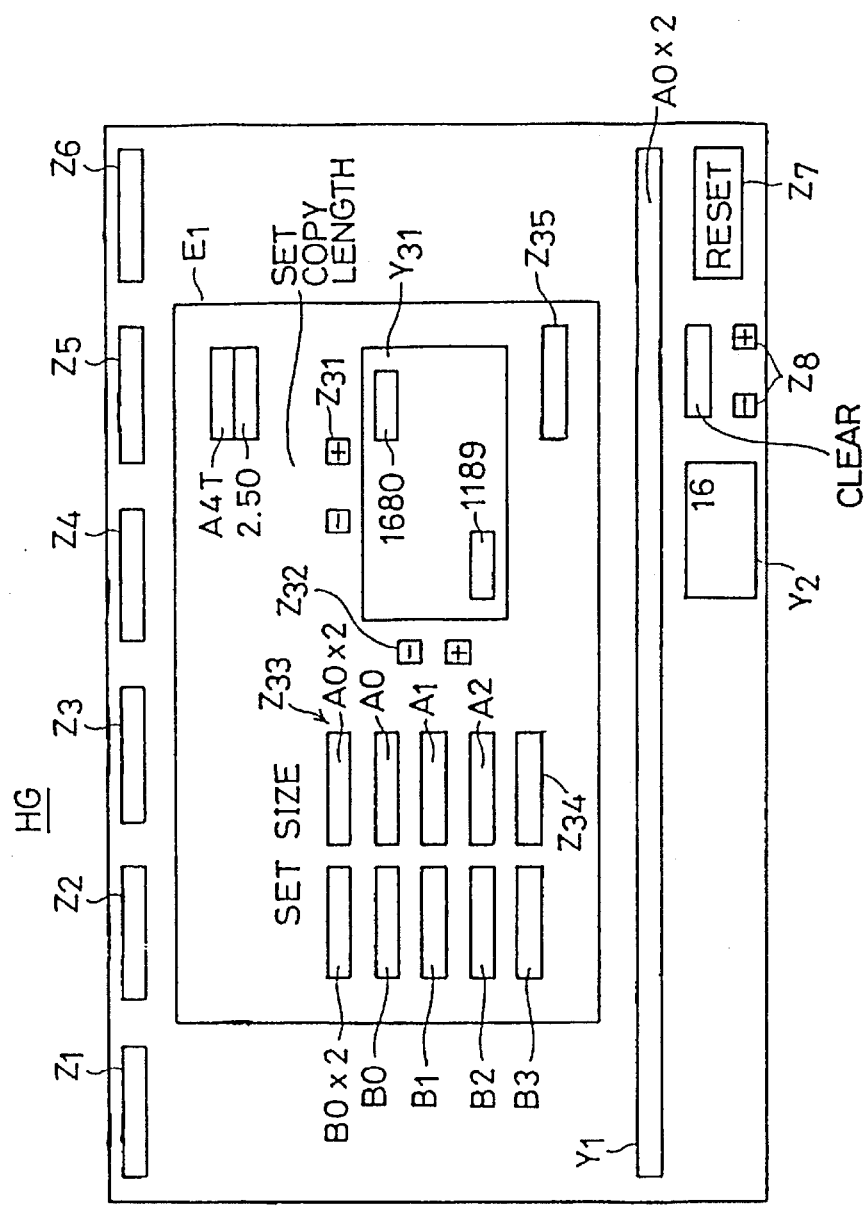
FIG. 15 is a view of a picture frame showing a menu for setting enlarging by continuous printing output size.

FIG. 15 is a view showing the picture frame of a menu for setting enlargement by continuous printing output sizes.

In the menu for setting enlargement by continuous printing output sizes, displayed are copy length setting buttons Z31 and Z32 for directly setting values for sizes in the vertical and lateral directions, a size designation button Z33 for setting a regular size paper sheet by selecting from A0×2, A0, A1, A2, B0×2, B0, B1, B2, and B3, a partial output button Z34 for outputting only a part of an image, an end button Z35, and the size and magnification M of one output paper sheet.

In the submenu picture frame, when an output image size is decided by copy length setting buttons Z31, Z32 or size designation button Z33, the number of sheets necessary for every paper size actually installed in sheet cassettes and a paper size in a smaller number is selected first, and the result is displayed in picture frame HG. However, if the necessary numbers are identical between a plurality of paper sheet sizes, the smaller paper sheet size is selected first.

A size for use input key or the like may be provided so that paper sheets of a desired size can readily be selected.

Figure 16:
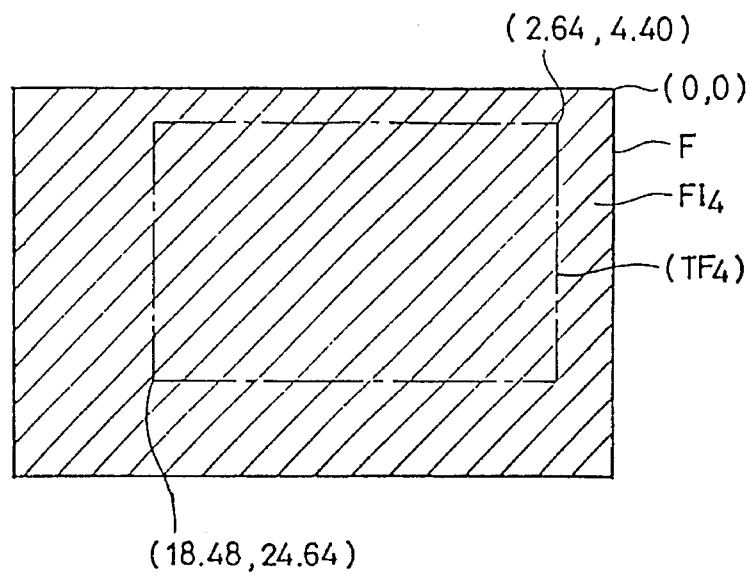
FIGS. 16A–16C are views showing picture frame for confirmation in film image and enlarging by continuous printing modes.
Figure 16:
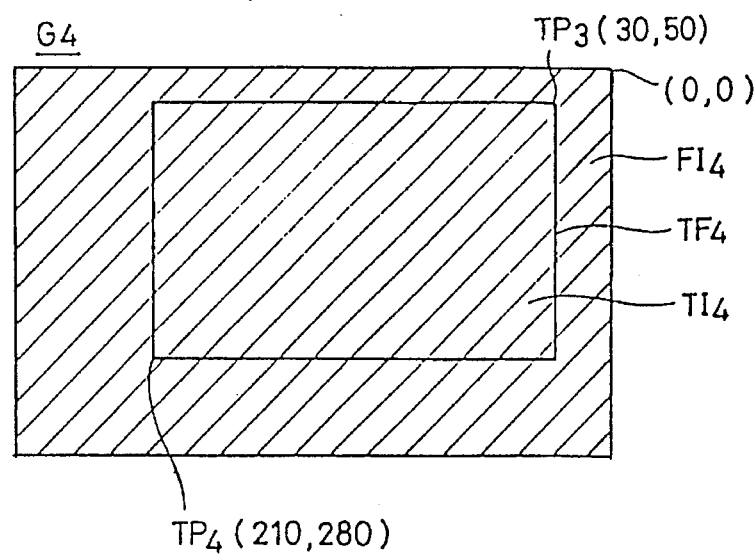
Figure 16:
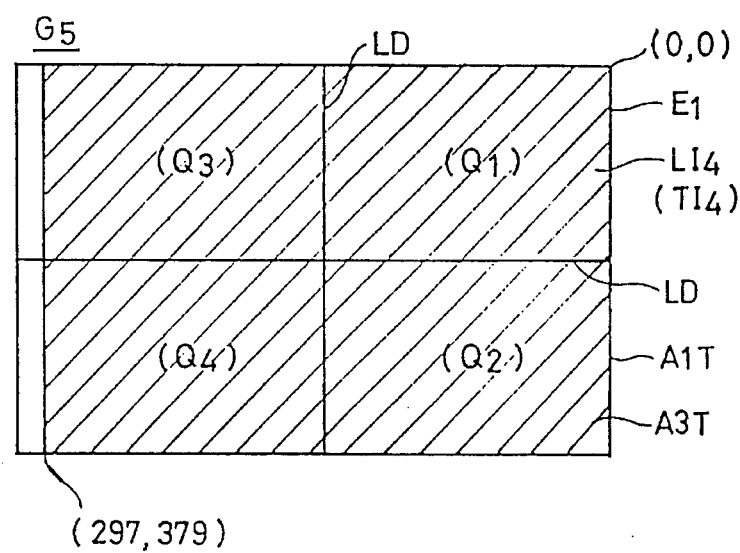

Thereafter, when output confirmation button Z5 is input, based on the result of calculation and the result of selection, the states of a hard copy image to be actually formed on an output paper sheet is displayed as confirmation picture frame G5 [see FIG. 16 (c)]. If confirmation picture frame G5 is not as desired by the operator in the size of the image LI enlarged by continuous printing or the positional relation between the image LI enlarged by continuous printing and the paper sheet, the menu for setting enlargement by continuous printing output size can be once again displayed to change the set value. If the image LI enlarged by continuous printing is desired to be formed in a paper sheet of a different size, the other paper sheet cassettes are detached in advance so that the desired paper sheet size is selected over the others.

The size of an original image means the size of an image in a paper sheet when a film image based on which the image LI is enlarged by continuous printing or its trimmed image TI is output at the equal scale magnification. The magnification M is usually larger than 1, because the size of the image LI enlarged by continuous printing is usually larger than the size of the original image, but if the size of the image LI enlarged by continuous printing is set extremely small, the magnification M sometimes becomes smaller than 1 and is reduced conversely.

Figure 17:
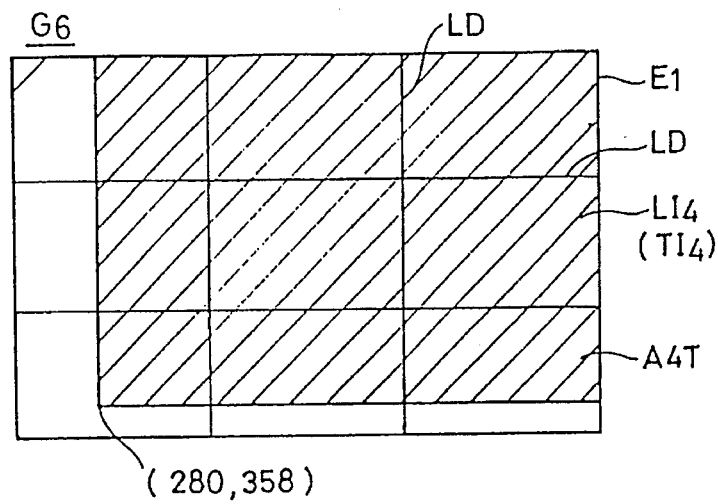
FIGS. 17A–17C are a view showing other picture frames for confirmation for a trimmed image in an enlarging by continuous printing mode.
Figure 17:
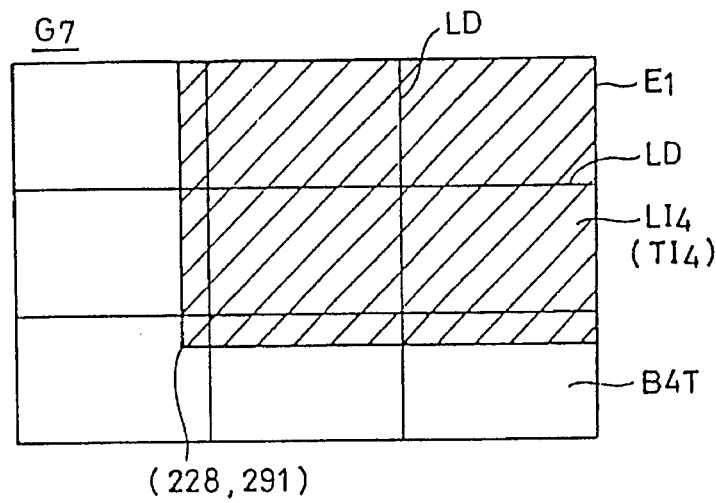
Figure 17:
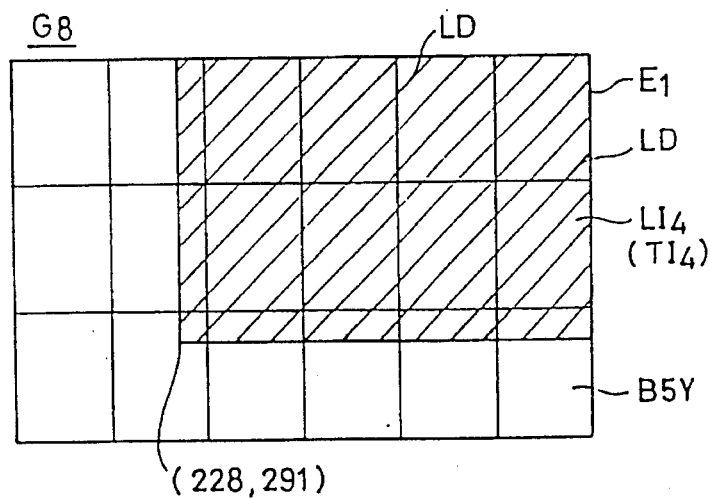

FIG. 16 is a view showing a film image FI4 and its confirmation picture frame G5 in the enlargement by continuous printing mode, and FIG. 17 is other confirmation picture frames G6–G8 in the enlargement by continuous printing mode of a trimmed image TI4. It is noted that FIG. 16 (a) shows the film image FI4 of the film F itself, FIG. 16 (b) the film image FI4 displayed with the display magnification Mdisp being as the equal scale magnification in a picture frame for trimming editing G4, and FIG. 16 (c) the confirmation picture frame G5 in the enlargement by continuous printing mode of the trimmed image TI4.

Referring to these figures, the relation between the image LI enlarged by continuous printing and paper sheets in the enlargement by continuous printing mode will be described. It is noticed that paper sheets of A3T, A4T, and B4T are set in paper sheet cassettes in film scanner 1.

In FIG. 1 showing a film F, the size of the film F, in other words the size of its film image FI4 is vertically 22.88 mm and laterally 31.99 mm. When the film image FI4 is read by image sensor IS of 4096 pixels in a main scanning direction, the reading density is 179 dots/mm, while if the image is read by scanning in a subscanning direction at the same reading density as the main scanning direction, the number of pixels in the subscanning direction is 5726 (=31.99×179) dots.

When thus read film image FI4 is printed out with the magnification M at the equal scale magnification by a printer of 400 dpi (15.75 dots/mm), the size of its hard copy image is vertically 260 (=4096/15.75)mm and laterally 364 (5726/ 15.75)mm.

In the picture frame for trimming editing G4 shown in FIG. 16 at (b), since the display magnification Mdisp is the equal scale magnification, the film image FI4 is displayed in vertically 260 dots and laterally 364 dots in the image display region E1. The relation between the number of dots of the film image FI4 in the picture frame for trimming editing G4 and the size of the film image FI4 of the above-stated film F (mm) is represented by 11.36 (=260/ 22.88) dots/mm or 0.088 (=22.88/260) mm/dots.

In the picture frame for trimming editing G4, a trimming frame TF4 is decided by designating two points, point TP3 (30,50) and point TP4 (210,280), thereby deciding its trimming image TI4. The region on the film F corresponding to the trimming image TI4 is indicated by a a chain line in FIG. 16 (a).

Now, when the enlargement by continuous printing mode is set using the trimmed image TI4 as an original image, with the output image size being set to be A1T, A3T is selected for the paper size and the number of sheets necessary is calculated to be "4." If the output confirmation mode is set at that time, confirmation picture frame G5 shown in FIG. 16 (c) is displayed.

Displayed in picture frame G5 is the state in which A3T paper sheets Q1–Q4 are arranged by twos in both vertical and lateral directions, in other words totally four sheets are arranged along dividing lines LD, thereby forming the size of an A1T paper sheet, and the state of the image LI4 enlarged by continuous printing which is enlarged at such a magnification M [3.3 times=594/(210−30)] that the vertical direction size of the trimmed image TI4 matches the full size of the vertical direction of the A1T paper sheet, with one state overlapping the other in the picture frame HG. The left end portion of image display region E1 is displayed in white, because no image exists therein.

It is noted that the display magnification Mdisp for confirmation picture frame G5 is ½ (=297/594). As for paper sheets other than paper sheets of A3T, the result of calculation of the necessary numbers indicates three in the vertical direction and three in the lateral direction, nine in total both for A4T paper sheets and B4T paper sheets.

As for the dividing line LD, its display position in the picture frame is calculated based on the necessary number of sheets or the number to be displayed which are given by the calculation, and based on the calculation result, the line is drawn in the character plane of the above-stated VRAM 24. The image of the dividing line LD written in the character plane and the image written in the image plane are combined to be displayed as confirmation picture frame G.

If the A3T paper sheets are not set, A4T paper sheets are selected as output paper sheets, and FIG. 17(a) shows a confirmation picture frame G6 produced in that case. Furthermore, if the A4T paper sheets are not set either, B4T paper sheets are selected as the output paper sheets and FIG. 17(b) represents a confirmation picture plane G7 in that case.

In these confirmation picture frames G6 and G7, the size larger than A1T which is the size of the output image is displayed in the image display region E1, but in either case of the A4T paper sheet and B4T paper sheet, the numbers in the vertical direction and lateral direction are the same and the entire image display region E1 takes a similar form to a regular size paper sheet.

Furthermore, if B5Y paper sheets are selected, the necessary number is 15 in total, in other words three in the vertical direction and five in the lateral direction, but in the confirmation picture frame, totally 18 sheets (3 in vertical direction and 6 in lateral direction) are displayed so as to form the A1T size as a whole. FIG. 17 (c) shows a confirmation picture frame G8 displayed in that case.

Therefore, the display magnification Mdisp of confirmation picture frame G8 becomes a magnification allowing the image LI4 enlarged by continuous printing to be displayed with respect to the A1T size of 18 sheets of B5Y paper sheets displayed in the picture frame.

As can be understood from these drawings, if the necessary numbers for arrangement are different in the vertical direction in the lateral direction with respect to a T paper sheet (paper sheet placed in the vertical direction), because of the elongated form of the image LI enlarged by continuous printing or if paper sheets arranged in the lower end are blank, the paper sheets are arranged for display so that the entire image display region E1 takes a similar form to regular paper sheets.

Therefore, in practice unnecessary paper sheets on which no hard copy image will be formed, for example, as three paper sheets in the left end portion shown in confirmation picture frame G8 in FIG. 17 (c), the paper sheets are displayed in white. Such display is advantageous, because it permits a wider range of movement in an operation of moving the image LI enlarged by continuous printing which will be described later is enlarged. However, such blank paper sheets can be displayed in the same color as the background color or other colors or patterns, while the other paper sheets exclusive of these three sheets may be disposed for display in the center of the image display region E1.

Referring to FIG. 16(A–C) after confirming the state of the image LI enlarged by continuous printing by the use of picture frame G5, when print key 74 is turned on, the portions of the film image FI4 on the film F corresponding to the paper sheets Q1–Q4 are read by image sensor IS by scanning four times, and the resultant image signals are subjected to a prescribed processing for output, and the resultant images are printed out on the respective four sheets A3T paper.

More specifically stated, when print key 74 is pressed, only the portion of film image FI4 corresponding to Q1 is scanned four times, and the image of the portion corresponding to Q1 is output onto one sheet and the sheet is discharged outside the apparatus. Then, the portion corresponding Q2 is scanned four times, and the image of the portion corresponding to Q2 is output on one sheet. This process (scanning four times plus image forming once) is repeated four times to print out four sheets. This is because, according to a usual full color printer, toners of three colors, cyan, magenta, and yellow are piled in turn to form a color image. More specifically, in the apparatus of this embodiment, in order to reproduce color more accurately, in addition to these three colors a black toner is used to form a color image. Therefore, scanning is conducted four times for each image.

As described above, confirmation picture frames G5–G8 are displayed in picture frame HG, the operator can easily confirm how a specified original image is divided onto a plurality of paper sheets when he/she performs enlargement by continuous printing. Furthermore, if the image is not divided in the way he/she desires it to be, re-setting can be performed easily, so that miscopying and waste can be avoided, thereby readily providing a hard copy image as desired.

The positions of the portions of the film image FI4 in the film F corresponding to the paper sheets Q–Q4 can be produced from the position of corner points of a square indicated by a chain in FIG. 16 at (a), the vertical and lateral sizes "297" and "420" for an A3T paper sheet, and the position on the film F corresponding to the dividing line LD calculated using a conversion coefficient "0.088" of the number of dots of the film image FI4 in the picture frame for trimming editing G4 and the size of the film image FI4 of the film F and a magnification "3.3", scanning is performed so as to read the film image FI4 in the respective portions, and the resultant signals are processed.

Since the scanning is performed from the side of the origin of the film F (right end side) to the left side of the figure, the respective image portions are also scanned from their right end portions to the left end portions.

For example, in the first scanning for printing out on the paper sheet Q1, the starting position is at 2.64 mm in the main scanning direction and 4.44 mm in the subscanning direction, the end position is at 10.56 (=2.64+297×0.088/3.3)mm is the main scanning direction and 15.60 (=4.4+420×0.088/3.3)mm in the sub scanning direction.

Upon scanning the film image FI4, the mirror installed in main body 11 moves in the subscanning direction, stands by at a position a fixed distant b behind the starting position of the image portion to be read, which distance is necessary for moving until its speed reaches a prescribed level a at the time of reading, and the mirror starts moving in response to a start signal.

The speed a is a speed at which 1 dot read by image sensor IS corresponds to 1 dot of a hard copy image when the magnification M is the equal scale magnification. Therefore, the speed changes in accordance with the magnification M, and the distance b slightly changes accordingly.

Figure 18:
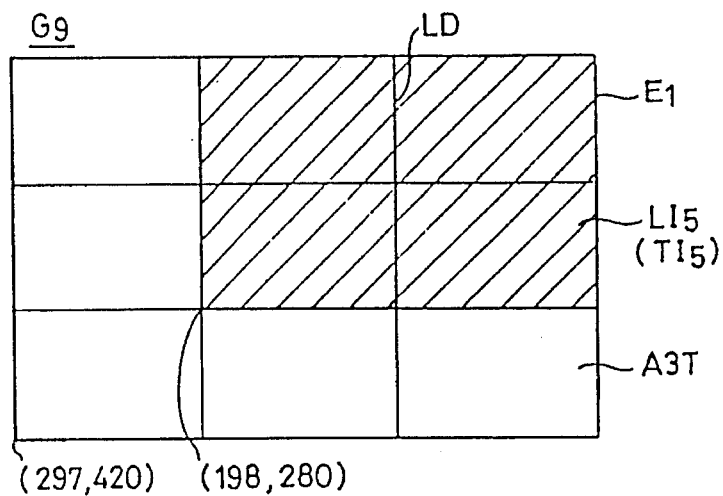
FIGS. 18A & 18B are a views showing picture frames for confirmation for a trimmed image in an enlarging by continuous printing mode.
Figure 18:
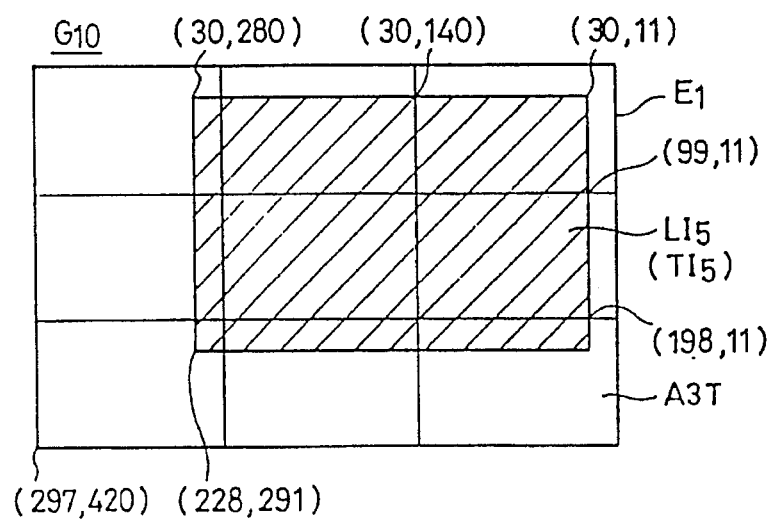

FIG. 18 is a view showing confirmation picture frame G9–G10 for a trimmed image TI5 in the enlargement by continuous printing mode.

In confirmation picture frame G9 shown in FIG. 18 (a), nine sheets of A3T paper (three each in the vertical and lateral directions) are displayed, and an image LI5 enlarged by continuous printing from the trimmed image TI5 is displayed in the full size of an A1T paper sheet over four sheets of A3T in the upper right part. Therefore, the remaining five sheets of paper are blank.

When enter key 72 is turned on in this state with the cursor CU being displayed in the image LI5 enlarged by continuous printing, it is permitted to move the image LI5 enlarged by continuous printing. When truck ball 71 is operated in this state, since the frame of the image LI enlarged by continuous printing moves following cursor CU, if the cursor is moved to a desired position and enter key 72 is turned on, the image LI enlarged by continuous printing is displayed in that position. Thus move states is displayed in confirmation picture frame G10 shown in FIG. 18 (b).

In confirmation picture frame G10, the image LI5 enlarged by continuous printing is displayed entirely over the nine sheets of paper, and when the image is printed out, a hard copy image of A1T size is formed over the nine sheets of paper.

Thus, the image LI5 enlarged by continuous printing can freely be moved within the range of sheets displayed in the picture frame HG and if an important portion resides in the boundary portion between sheets, the entire image can be moved so as to place that portion in the center of a sheet, thereby preventing the impression of the entire image from being deteriorated or indefinite.

The image in the sheet may be moved with respect to the output image by expanding the picture frame displayed in the display (reducing the image display).

Furthermore, only a part of image signal corresponding to one paper sheet rather than the image LI enlarged by continuous printing as a whole can be output by inputting partial output button Z34 in the above-stated menu for setting enlargement by continuous printing output size. When partial output button Z34 is input, a plurality sheets of paper delineated by dividing lines LD are displayed in the image display region E1, and displaying cursor CU at the position of a desired sheet and turning on enter key 72 permits a prescribed portion of the film F is read and the image signal of the corresponding portion is output. Thus, the partial image is printed out in a sheet of paper.

Therefore, if one among the plurality of paper sheets on which a hard copy image is formed by enlargement by continuous printing is damaged or lost, only the corresponding portion can be printed out rather than once again forming a hard copy image as to all the paper sheets, and waste of time, labor and resources can be prevented.

Now, a control operation by CPU 201 will be described in conjunction with a flow chart.

Figure 19:
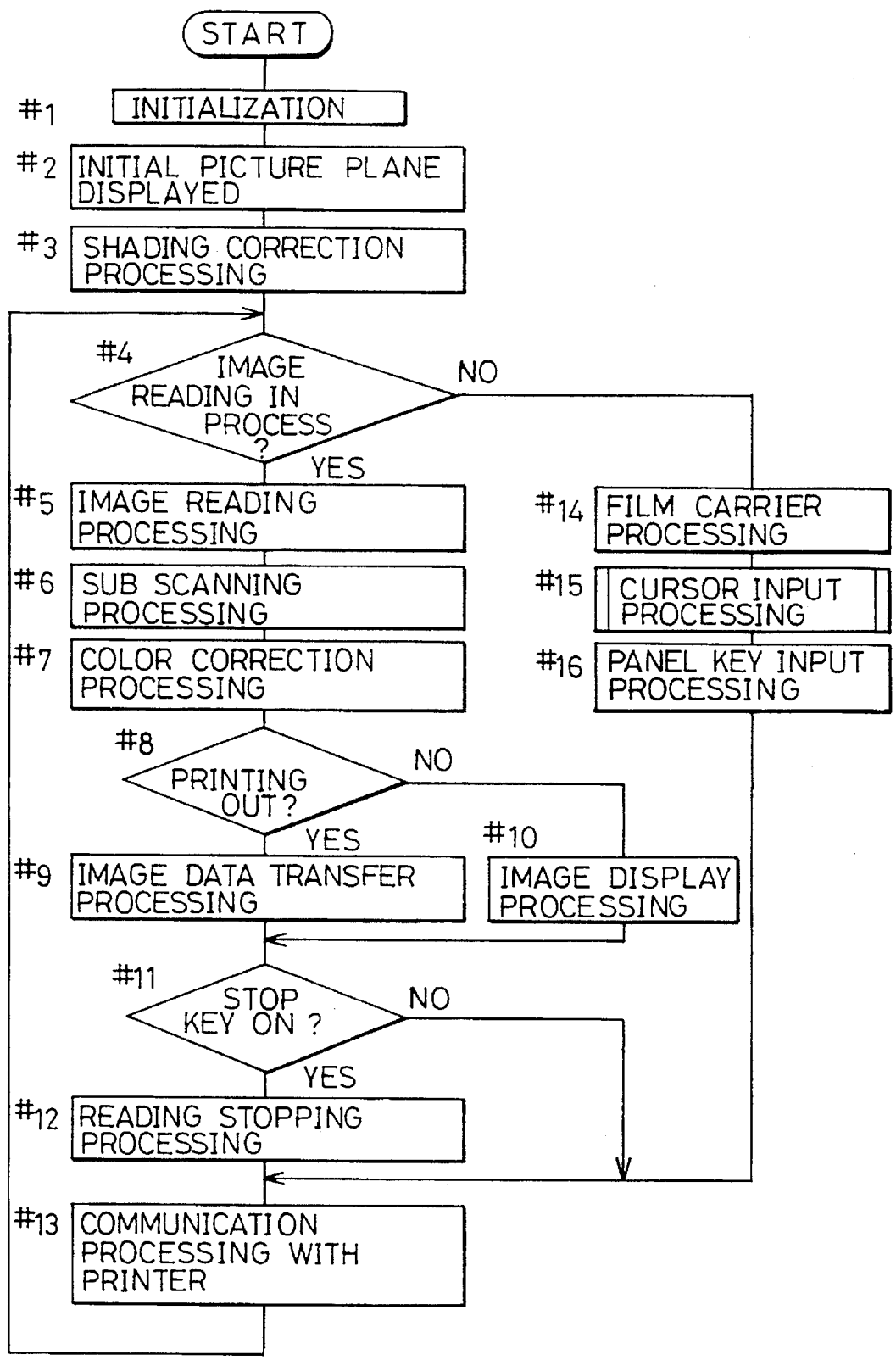
FIG. 19 is a main flow chart schematically showing an operation of a CPU.

FIG. 19 is a main flow chart schematically showing an operation of CPU 201.

When a power supply is turned on and a program starts, an initialization setting for initializing the state of a memory or the like (step #1) is performed, an initial picture frame is displayed on the picture frame HG of display unit 12 (step #2) and a processing for shading correction is performed at image input portion 221 (step #3).

Then, it is checked whether or not an operation of reading a film image is going on is performed (step #4), and if the reading operation is in process, a processing of reading the image while controlling a signal processing by image input portion 221 (step #5), a subscanning processing for scanning and reading the film image by image sensor IS (step #6), and a color correction processing (step #7) are sequentially executed.

Subsequently, it is checked whether or not the reading going on at present is for printing out (step #8). More specifically, it is checked whether or not the reading is in response to turning on of print key 74.

If the result in step #8 is YES, an image data transfer processing for outputting the image information to a printer is executed (step #9), while if the result in step #8 is NO, an image display processing for displaying the read image is executed (step #10).

Then, an on-check for stop key 75 is executed (step #11), and if stop key 75 is turned on, a reading stopping processing is executed (step #12). Thereafter, a communication processing with the printer is performed (step #13), and the process returns to step #4.

If the result is NO in step #4, a film carrier processing for detection or the like of the presence/absence of a film F installed and the kind of the film (step #14), a cursor input processing related to a position designation by cursor CU (step #15), and a panel key input processing for accepting a key operation on operation panel OP (step #16) are sequentially executed, and then the process proceeds to the above-stated step #13.

Figure 20:
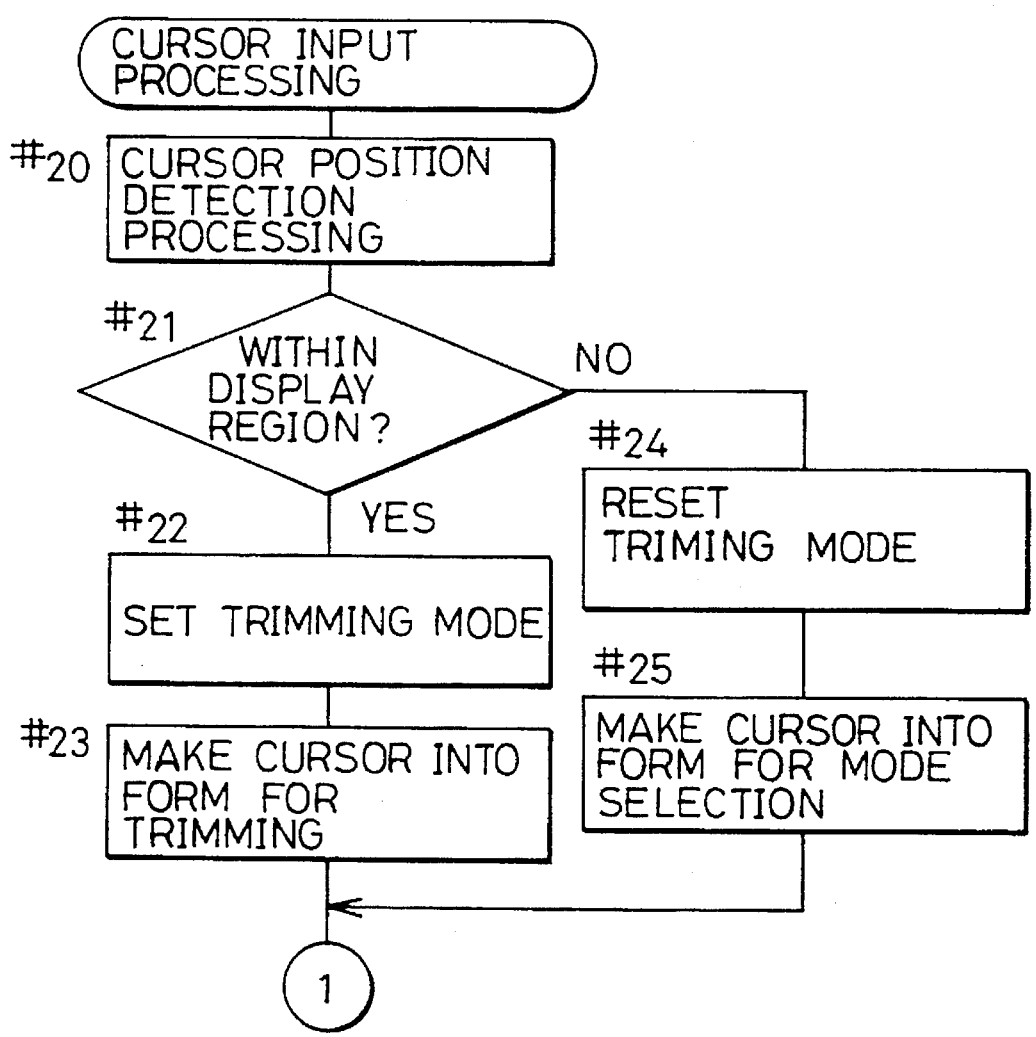
FIG. 20 is a flow chart showing a cursor input processing.
Figure 21:
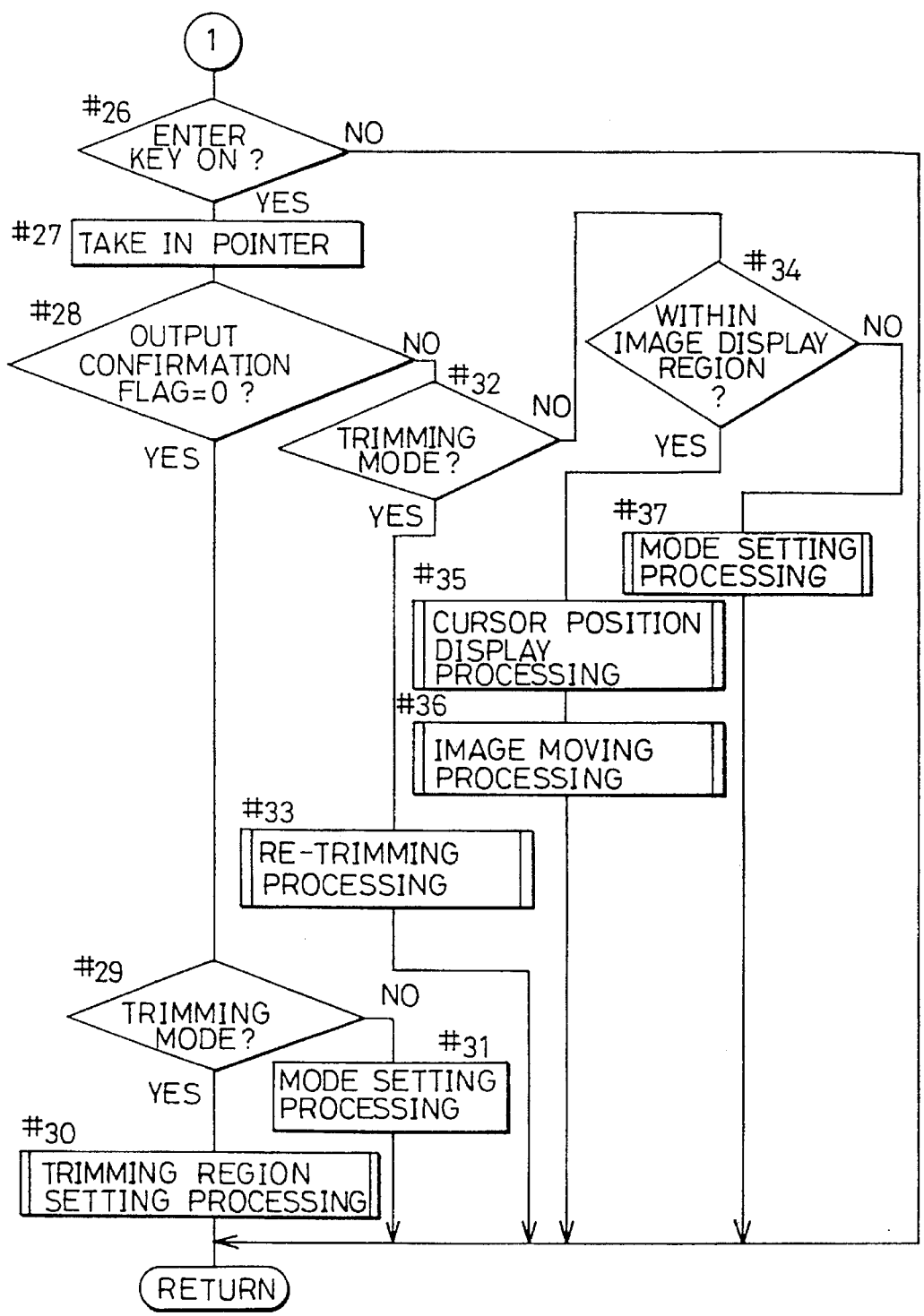
FIG. 21 is a flow chart showing a cursor input processing.

FIGS. 20 and 21 are flow charts showing a cursor input processing.

First, a cursor position detection processing is executed (step #20). In the cursor position detection processing, the coordinate position of cursor CU in picture frame HG at present is detected. Based on the result of detection, it is checked whether or not the position of the cursor CU is within the image display region E1 (step #21).

If the result of the determination in step #21 is YES, a trimming mode is set and cursor CU is made in a form for the trimming mode (step #22 and step #23). If the result is NO in step #21, the trimming mode is reset, and the cursor CU is made in a form for mode selection (step #24 and step #25).

Then, an on-check of enter key 72 is performed (step #26). If enter key 72 is on, the coordinate values (cursor pointer) corresponding to the position of cursor CU at that time are taken in (step #27).

Whether output confirmation button Z5 has been turned on or not, in other words if an output confirmation has been made can be determined by checking an output confirmation flag (step #28).

If it is before an output confirmation (YES in step #28) whether or not the trimming mode is set is checked (step #29), and if the trimming mode is set, a processing of setting a region to be trimmed is executed (step #30), and if the trimming mode is not set, a mode setting processing for setting an operation mode corresponding to a selected one of the above-stated buttons Z is executed (step #31).

If an output confirmation has already been made (NO in step #28), whether or not the trimming mode is set is checked (step #32) and if the trimming mode is set, a retrimming processing for resetting the region to be trimmed is executed (step #33).

If the trimming mode is not set, determination as to the position of cursor CU when enter key 72 is turned on, in other words a determination whether or not the values of the cursor pointer taken in are within the image display region E1 is made (step #34). If the values are within the image display region E1, a cursor position display processing for converting a position of cursor CU into a position on a sheet (length) thereby displaying in value is executed (step #35), and then an image moving processing is conducted (step #36). If the values are without the image display region E1, a mode setting processing is executed (step #37).

Figure 22:
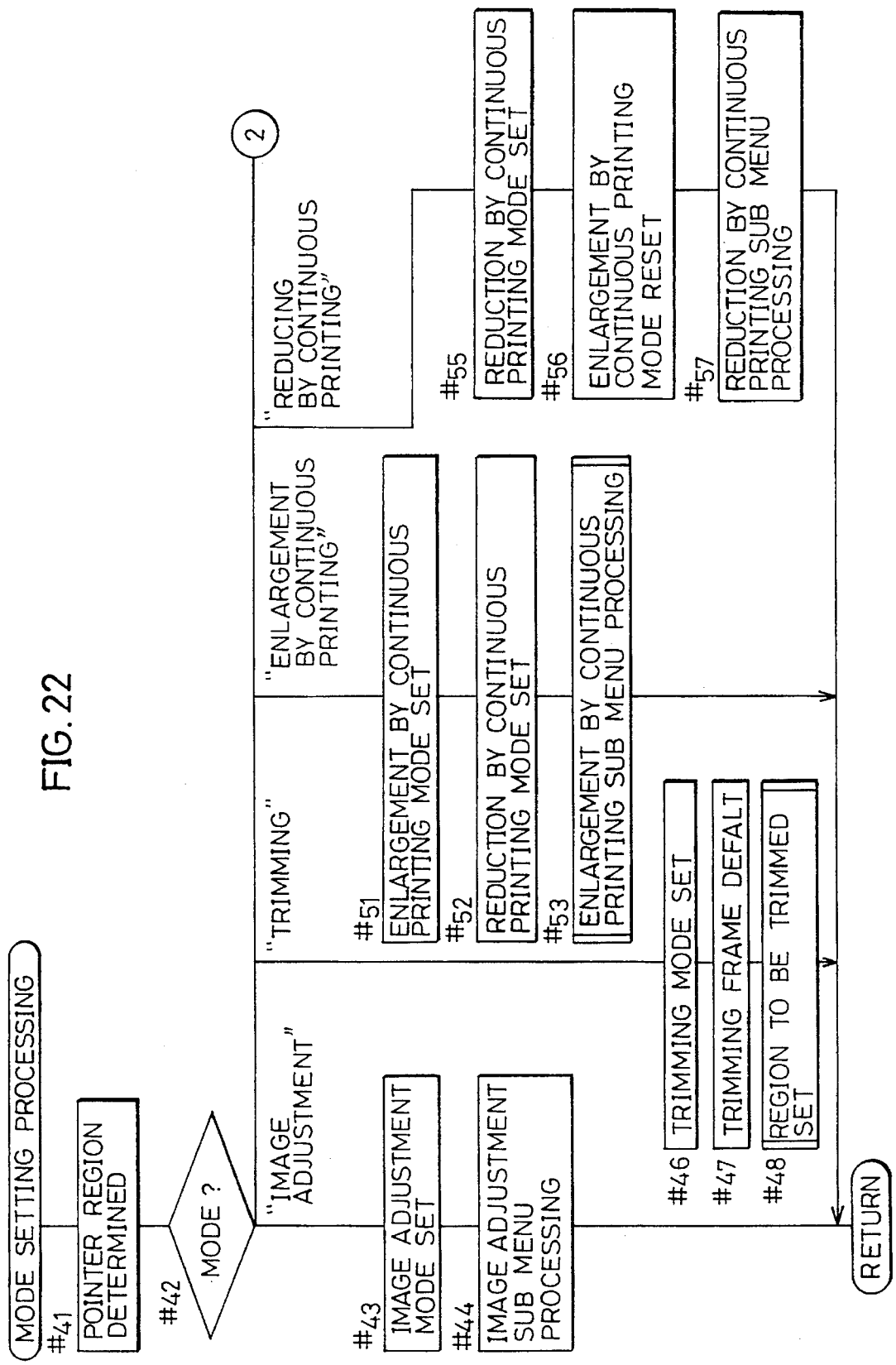
FIG. 22 is a flow chart showing a mode setting processing.
Figure 23:
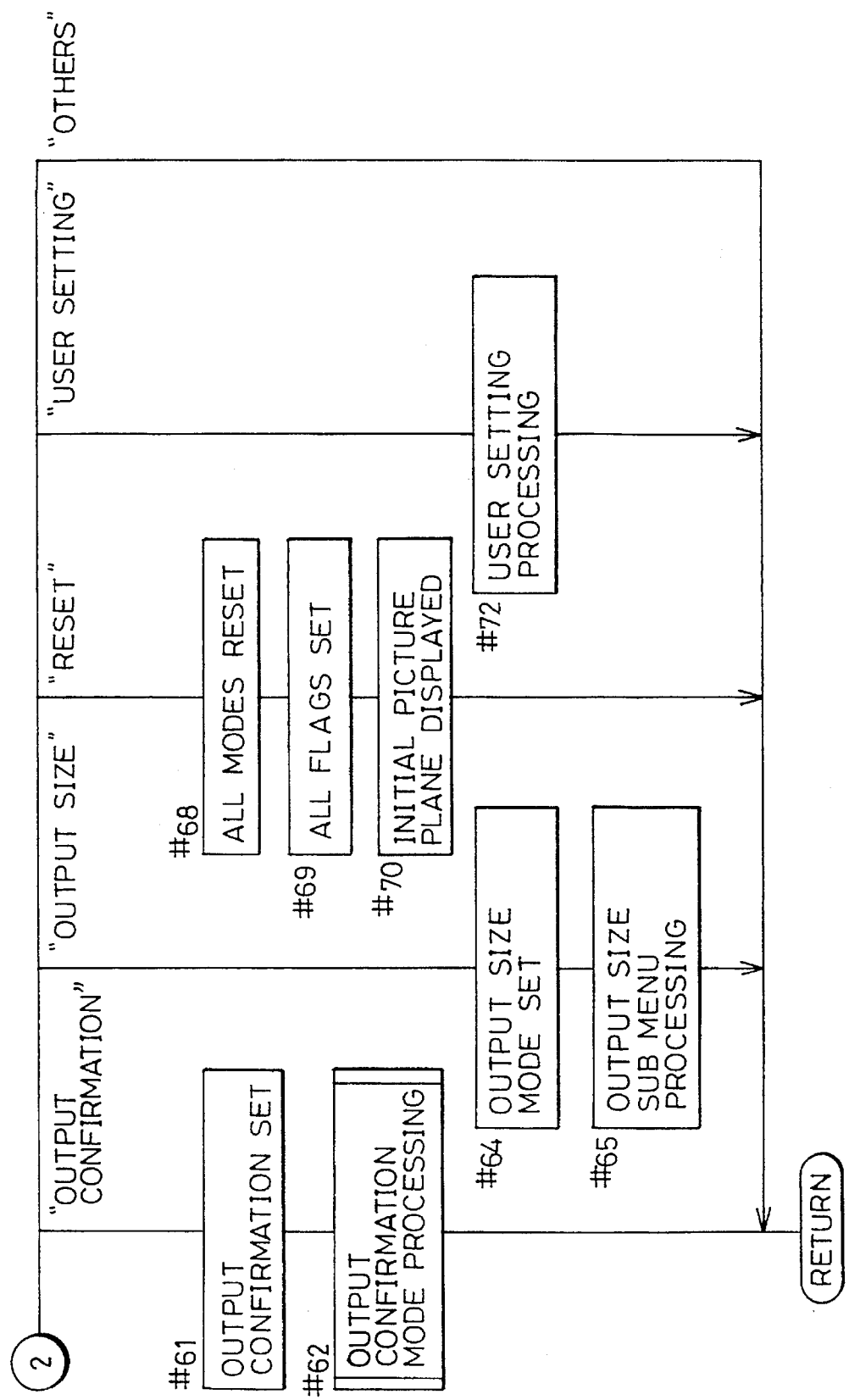
FIG. 23 is a flow chart showing a mode setting processing.

FIGS. 22 and 23 are flow charts showing the mode setting processing.

Which of buttons Z is input is determined by determining the region of the cursor pointer (steps #41 and #42), a mode corresponding to each button Z is set and a necessary processing is performed (steps #43–72).

It is noted that in an image adjustment submenu processing (step #44), an image density setting or a color balance adjustment is performed. In a trimming frame default setting processing (step #47), a default value for a trimming frame is set, and in a trimming region setting processing (step #48) a region to be trimmed is set. In a reduction by continuous printing mode resetting processing (step #52), enlarging by continuous printing mode is reset, and in enlarging by continuous printing submenu processing (step #53) a size for enlargement by continuous printing is designated. In an enlargement by continuous printing mode resetting processing (step #56), one mode which is not compatible is reset, and in a reduction by continuous printing submenu processing (step #57) an output mode is designated.

In an output confirmation mode processing (step #62) the relation between an image to be printed out and paper sheets is displayed in picture frame HG. In an output size submenu processing (step #65), the size of paper sheets to be output is set. In an all flag resetting processing (step #69), all the modes presently set are reset, and in an initial picture frame display processing (step #70), the initial picture frame is displayed. In a user setting processing (step #72), working environments such as the initial mode or a mode memory at the time of resetting is set by the user. If no button Z is input, the process returns without any processing.

Figure 24:
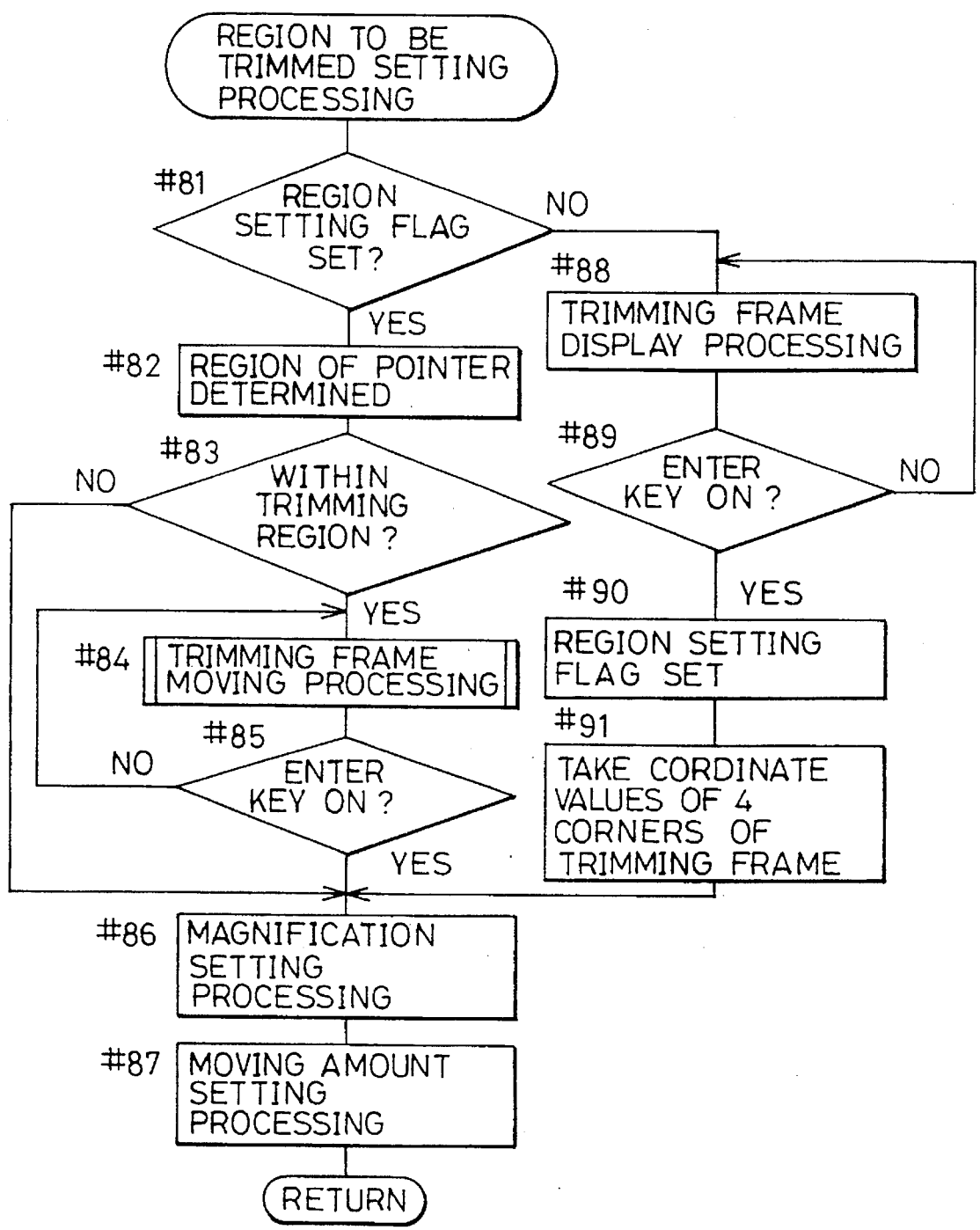
FIG. 24 is a flow chart showing a processing of setting a region to be trimmed.

FIG. 24 is a flow chart for use in illustration of the trimming region setting processing.

First, it determined whether or not a region setting flag is set (step #81). If the result of determination in step #81 is YES, a region to be trimmed has already been set, in which case the following processing concerning moving of the region to be trimmed is executed.

More specifically, a determination as to the region of the cursor pointer is executed (step #82), and if the cursor pointer corresponds to a position inside the region to be trimmed, the trimming frame moving processing for moving the trimming frame TF in picture frame HG in accordance with operation of truck ball 71 is repeated until enter key 72 is turned on (steps #83–85).

When enter key 72 is turned on, since the operation for moving the trimming frame has been completed, the process proceeds to step #86, a print magnification is set in accordance with the size of the region to be trimmed and the size of paper sheets, and in a subsequent step #87 the amount of moving the image for printing out at a prescribed position in a sheet is set in accordance with the position of the region to be trimmed.

If the result of the determination in step #81 is NO, the following processing concerning setting a new region to be trimmed is executed. A processing of displaying as a trimming frame TF a square having a first point designated in the image display region E1 and a second point which is the position of the cursor being diagonal is conducted (step #88). At that time, the trimming frame TF deforms in accordance with the movement of the second point due to the cursor moving operation described above.

Thereafter, when enter key 72 is turned on to secure the second point, a region setting flag is set, and pointers at the four corners of the trimming frame at that time are taken in (steps #89–91).

Figure 25:
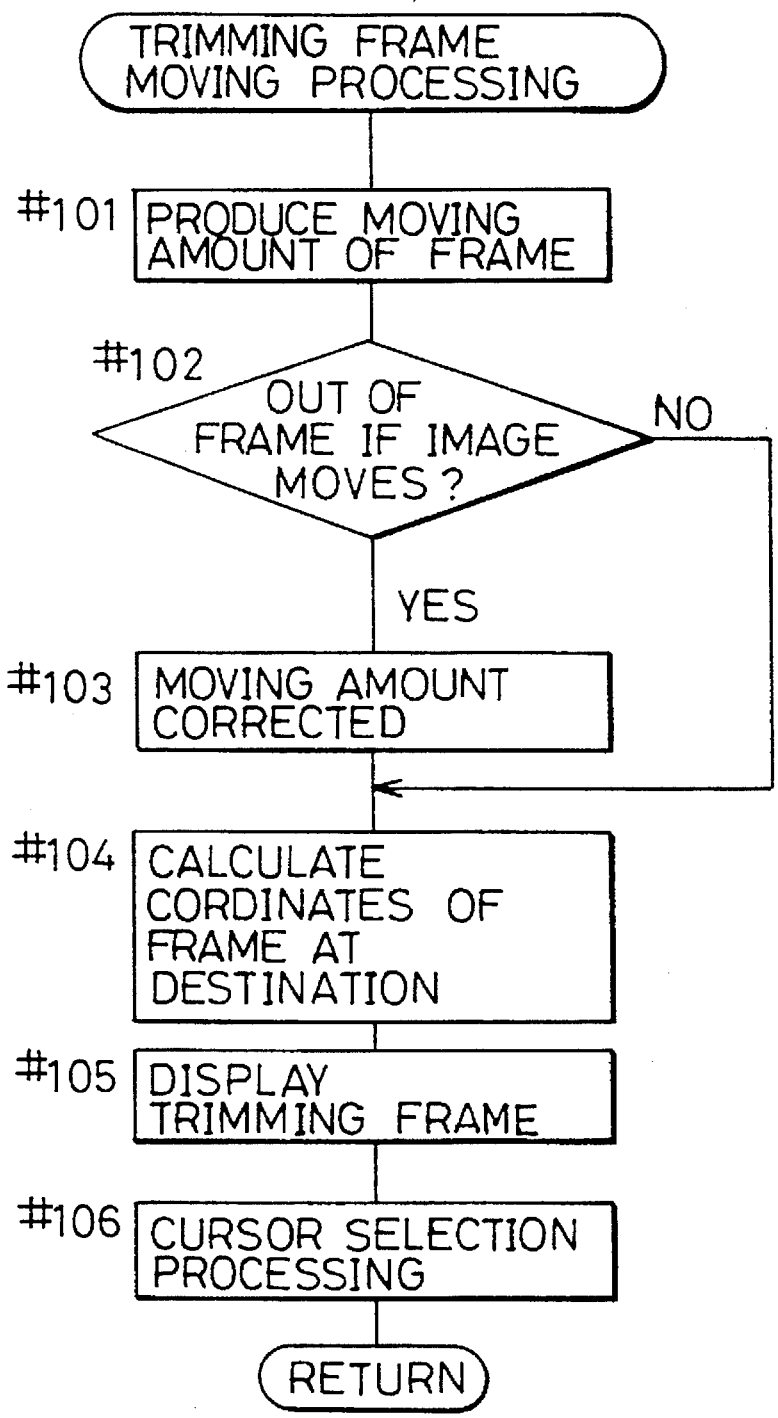
FIG. 25 is a flow chart showing a processing of moving a trimming frame.

FIG. 25 is a flow chart showing the trimming frame moving processing.

Based on the cursor pointer previously taken up and the cursor pointer at present, the amount of the movement of cursor CU in an X-direction (the lateral direction of picture frame) and a Y-direction (the vertical direction of the picture frame) are calculated as the amount of the movement of the trimming frame TF (step #101).

Then, the resultant value formed by adding the amount of the movement to the coordinate values of the four edges of the trimming frame TF at present is compared to the coordinate values of the four edges of the image display region E1, and it is checked whether or not the trimming frame TF goes out of the image display region E1 if the trimming frame TF is moved by the amount of the movement (step #102).

If the trimming frame TF goes outside the region, the amount of the movement is corrected so that the trimming frame TF stays within the image display region E1 (step #103).

Then, an operation of adding the amount of the movement corrected as needed to the coordinate value of the trimming frame TF at present is conducted to produce the coordinate values of the four corners of the trimming frame TF after the movement (step #104).

Then, a processing of displaying the trimming frame TF after the movement (step #105) and a cursor selection processing for displaying the cursor CU in a form having an arrow in a prescribed direction in accordance with the position of the trimming frame TF (step #106) are executed.

Figure 26:
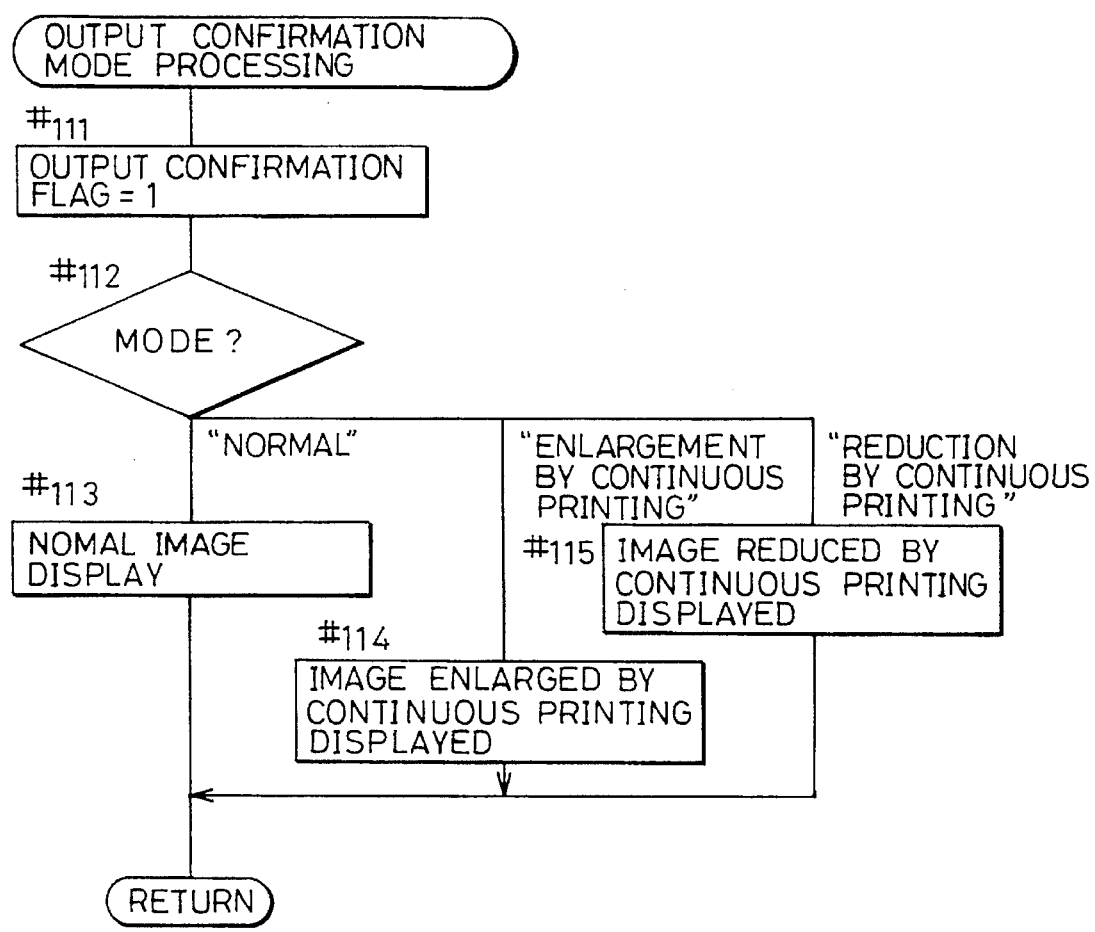
FIG. 26 is a flow chart showing an output confirmation mode processing.

FIG. 26 is a flow chart showing the output confirmation mode processing.

An output confirmation flag is set (step #111), and a normal copy image display (step #113), an enlargement by continuous printing image display (step #114), or a reduction by continuous printing image display (step ##15) is executed based on the mode at that time. In the enlargement by continuous printing image display (step #114), as described above, a processing of displaying dividing lines LD and an image enlarged by continuous printing LI4 or LI5 is executed.

Figure 27:
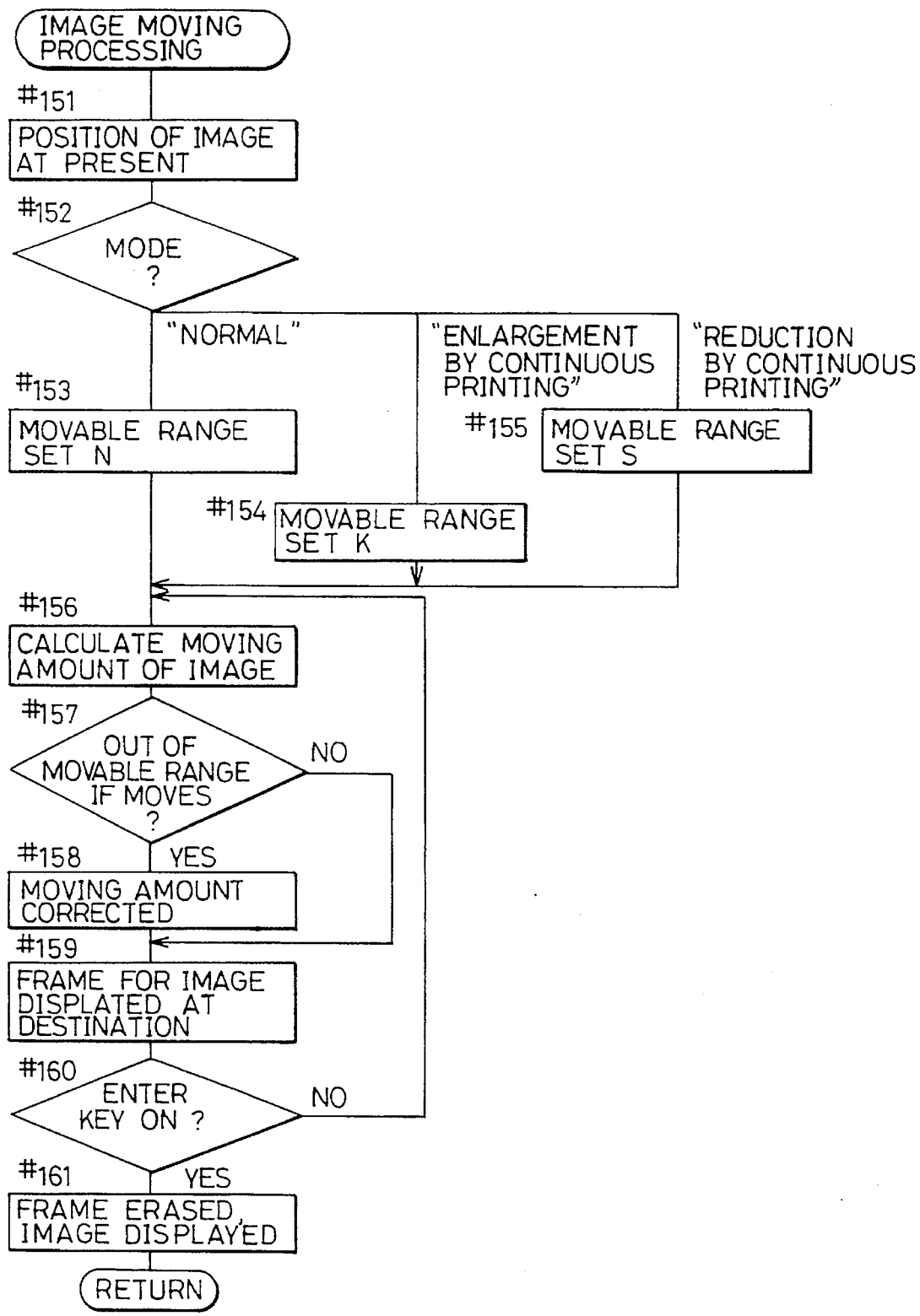
FIG. 27 is a flow chart showing an image moving processing.

FIG. 27 is a flow chart showing the image moving processing.

First the position of an image displayed at present is obtained (step #151). Then, the mode set at that time is determined (step #152), and if the mode is the normal copy mode, a movable range at the time of normal copy mode, in other words the values of the size of paper sheets presently selected are set (step #153), while if in the case of the enlargement by continuous printing mode, a movable range at that time of the enlargement by continuous printing, in other words the value of the number of sheets for output of the presently selected paper size is set (step #154), and if in the case of the reduction by continuous printing mode, a movable range at the time of reduction by continuous printing, in other words a value decided from the presently selected paper size and the number of dividing the paper sheet is set (step #155).

Then, based on the cursor pointer previously taken up and the cursor pointer at present, the amounts of movement of cursor CU in the X-direction and the Y-direction are produced as the amount of the movement of the image (step #156).

A value produced by adding the amount of the movement to the coordinate values of the four corners of the image at present is compared to the coordinate values of the four corners of the movable range set in any of the steps #153–#155, and is checked whether or not the image moves out of the movable range if the image is moved by the amount of the movement (step #157).

If the image moves out, the amount of the movement is corrected so that the image stays within the movable range (step #158). Then the coordinate values of the four corners of the image after the movement are produced by adding the corrected amount of movement to the coordinate values of the image at present, thereby displaying a frame indicating the positions (step #159).

These processings are repeated until enter key 72 is turned on, and a frame indicating the destination of the image in accordance with the movement of cursor CU is displayed.

Then, when enter key 72 is turned on (YES in step #160), the frame indicating the destination of the image is erased, and in order to move the image, the image data is transferred from input image memory 212 to the address of a destination within VRAM 240 produced based on the calculated amount of movement (step #161).

Figure 28:
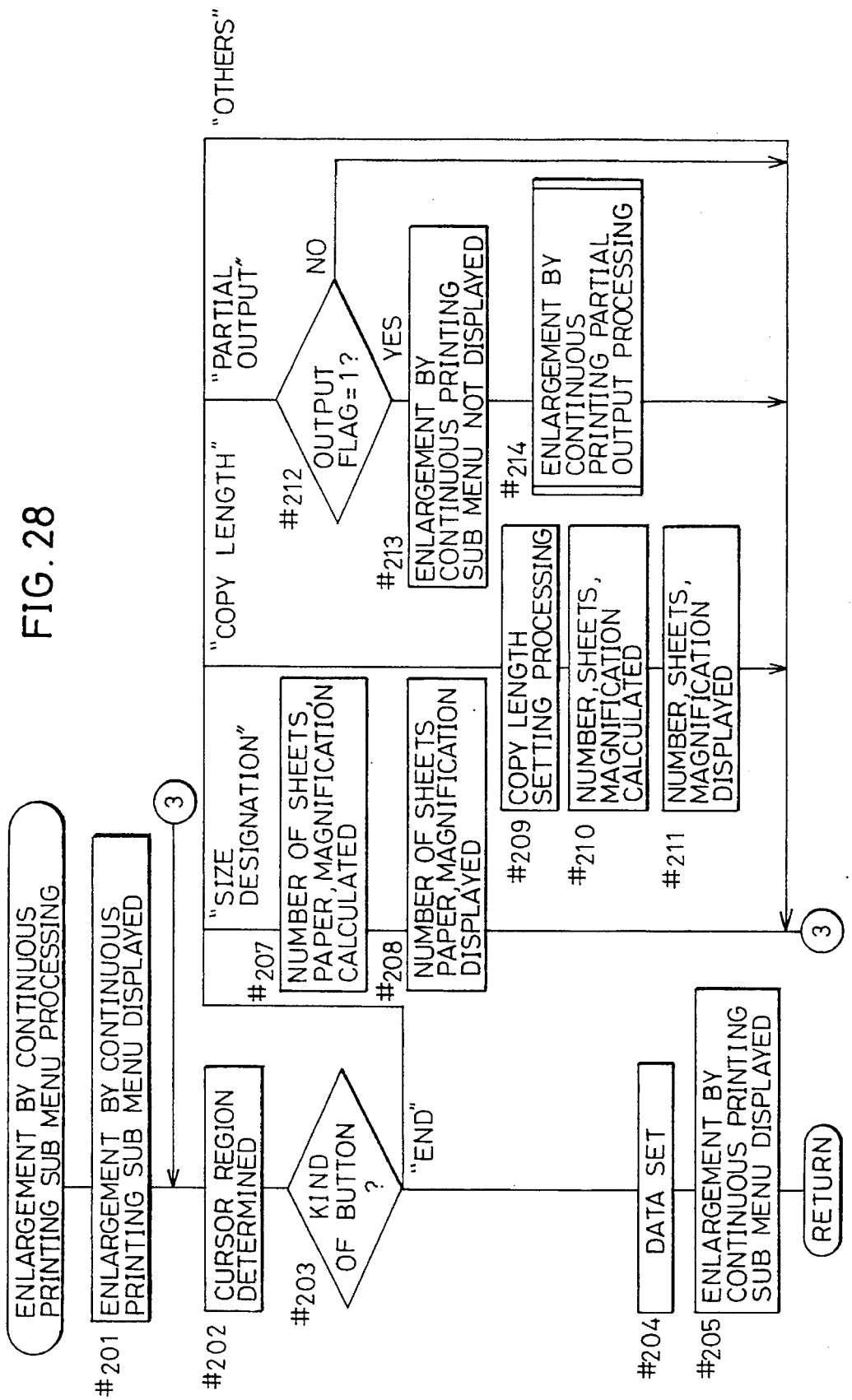
FIG. 28 is a flow chart showing submenu many processings in enlarging by continuous printing.

FIG. 28 is a flow chart showing the enlargement by continuous printing submenu processing. An enlargement by continuous printing output size setting menu which is an enlargement by continuous printing submenu is displayed (step #201), and the region of cursor CU when enter key 72 is turned on is determined and a corresponding button Z is input (steps #202 and #203).

If the corresponding button is size designation button Z33, a paper size, the number of sheets, and a magnification M are calculated based on the size of an output image designated by this button (step #207), and the result of calculation is displayed in picture frame HG (step #208).

In the case of copy length setting buttons Z31 or Z32, the size of the image LI enlarged by continuous printing is set based on the state of the buttons (step #209), a calculation is made based thereon (step #210), and the result of calculation is displayed in picture frame HG (step #211).

In the case of partial output button Z34, whether it is the output confirmation mode or not is determined by the output confirmation flag (step #212), and if it is in the output confirmation mode, display of the enlargement by continuous printing submenu is stopped and a non-display state is created (step #213), and an enlargement by continuous printing partial output processing for selectively outputting a part of the image LI enlarged by continuous printing is conducted (step #214).

In the case of the end button, after setting input or calculated data inside (step #204), display of the enlargement by continuous printing submenu is stopped (step #205).

Figure 29:
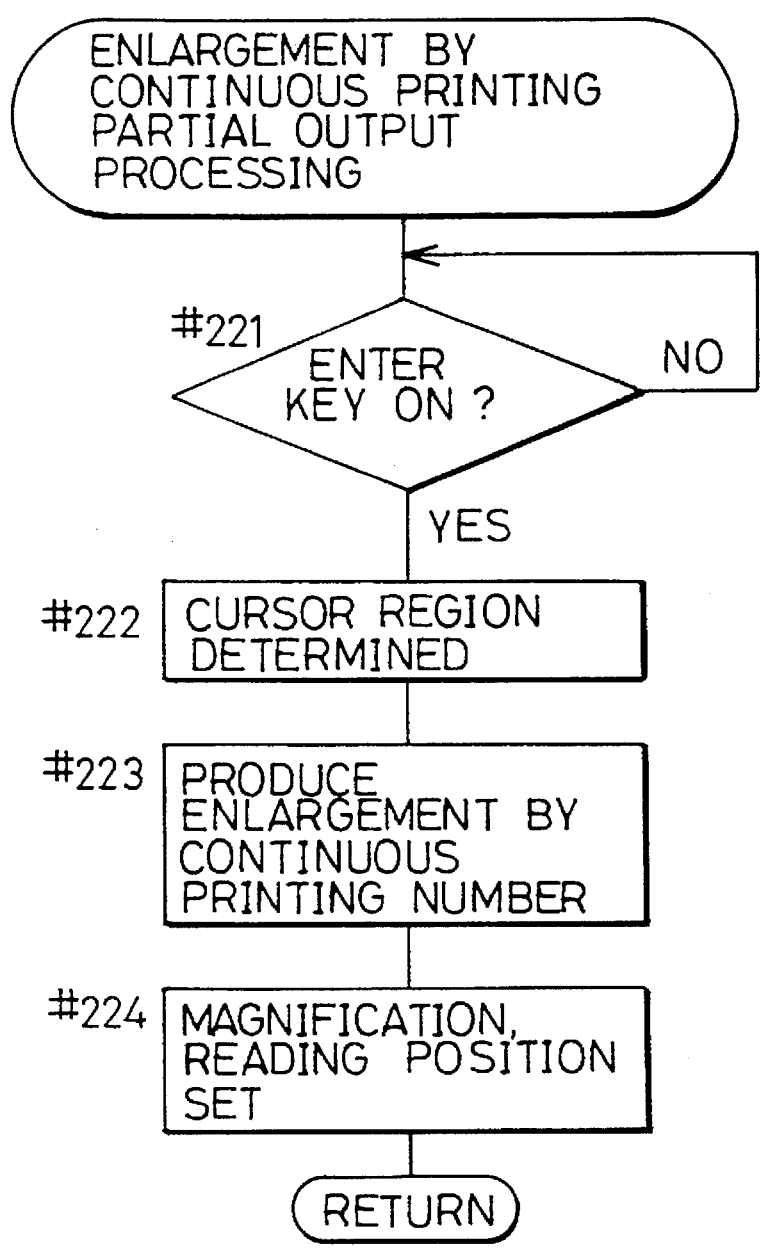
FIG. 29 is a flow chart showing a processing of outputting a portion to be enlarged by continuous printing.

FIG. 29 is a flow chart showing the enlargement by continuous printing partial output processing.

It is determined whether or not enter key 72 is turned on (step #221), and the region of cursor CU at that time is determined (step #222). Based on the region of cursor CU, an enlargement by continuous printing face number to determine the order of paper sheets output at the time of printing out in the enlargement by continuous printing mode is produced (step #223), and based on that enlargement by continuous printing face number, the magnification M, and the positions of starting and ending reading are calculated and set (step #224).

In the above-stated embodiment, the image LI enlarged by continuous printing is displayed together with the paper sheet in confirmation picture frames G5–G10, an image for only the frame, or the colored portion of that size without frame may be displayed rather than the image LI enlarged by continuous printing.

The structure of control portion 200, the operation timings, the contents of processings, the contents and order of the flow charts, the structure of picture frame HG, the structure of film scanner 1 and the like described in conjunction with the embodiment may be changed into various types.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of editing an image which is to be reproduced on a plurality of sheets by an image forming apparatus, said plurality of sheets being arranged such that a different portion of said image is to be reproduced on each of said plurality of sheets, comprising the steps of:

receiving image information related to a size of said image;

receiving sheet information related to a size of sheets to be used; and displaying a first image representing the size of said image and a second image representing the size of said arranged plurality of sheets based on the image information and the sheet information so that the first image overlaps with the second image.

2. A method of editing an image which is reproduced on a plurality of sheets by an image forming apparatus, comprising steps of:

receiving image information related to a size of said image;

receiving sheet information related to a size of sheets to be used;

calculating a necessary number of sheets on which said image is reproduced based on the image information and the sheet information;

selecting a sheet size which requires the minimum necessary number according to said calculating result; and displaying a first image representing the size of said image and a second image representing the size of said plurality of sheets of selected sheet size based on the image information and the sheet information so that the first image overlaps with the second image.

3. A method of editing an image recited in claim 2, the smallest sheet size is selected in said selecting step when the calculation result concerning one sheet size is equal to that concerning other sheet sizes.

4. A method of editing an image recited as recited in claim 1, further comprising a step of changing the position of said first image with respect to said second image.

5. An image editing apparatus used with an image forming apparatus forming an image on a plurality of sheets, comprising:

first recognize means for recognizing an image size of said image;

second recognize means for recognizing a sheet size used in said image forming apparatus;

calculate means for calculating a necessary number of the sheets over which said image is divided and produced, based on said image size and said sheet size;

display means for displaying a first image indicating the size of said calculated number of sheets and a second image indicating the size of said image; and control means for controlling said display means to overlap said first image and said second image on said display.

6. An apparatus as recited in claim 5, further comprising means for moving said second image relative to said first image on said display.

7. An apparatus as recited in claim 5, further comprising:

means for designating a desired area corresponding to one sheet displayed on the display means; and instruct means for instructing the image forming apparatus to form a partial image of said image corresponding to said designated area onto a sheet.

8. An apparatus as recited in claim 5, further comprising means for moving said first image relative to said second image on said display.

9. An apparatus as recited in claim 5, wherein said second recognize means recognizes all sheet sizes stored in said image forming apparatus and said calculate means calculates the necessary numbers for all sheet sizes, said apparatus further comprising means for selecting a sheet size having the smallest necessary number.

10. An apparatus as recited in claim 5, wherein said second recognizing means includes means for designating a desired sheet size.

11. A method of forming an image, comprising the steps of:

receiving an input image;

combining a first image representing the state of a plurality of sheets being sequentially arranged and a second image representing at least the size of said input image relative to said first image;

displaying the combined image of said first image and said second image on a display;

dividing said input image into a plurality of pieces based on the positional relation of said first image relative to said second image displayed on said display; and forming said divided input images on respective different sheets.

12. A method of forming an image as recited in claim 11, further comprising a step of adjusting the positional relation between said first image and said second image.

13. A method of forming an image, comprising the steps of:

receiving an input image;

combining a first image representing the state of a plurality of sheets being sequentially arranged, and a second image representing at least the size of said input image corresponding to said first image;

displaying the combined image of said first image and said second image on a display;

designating a part of said first image corresponding to a specified sheet among the plurality of sheets constituting said first image displayed on said display; and forming a part of said input image corresponding to said designated portion on a sheet.

14. An image displaying method for displaying an image comprising composing and displaying an image representing a plurality of sheets continuously connected to each other and an image to be reproduced on said sheets in such a manner that a different portion of said image is to be reproduced on each of the plurality of connected sheets.

15. An image editing apparatus used with an image forming apparatus for forming an image on a plurality of sheets arranged such that a different portion of said image is formed on each of said plurality of sheets, comprising:

first recognize means for recognizing an image size of said image;

second recognize means for recognizing a sheet size used in said image forming apparatus;

display means for displaying a first image indicating the size of said arranged plurality of sheets and a second image indicating the size of said image; and control means for controlling said display means to overlap said first image and said second image on said display.

16. An apparatus as recited in claim 15, further comprising:

calculating means for calculating a necessary number of sheets on which said image is reproduced based on the image information and the sheet information; and selecting means for selecting a sheet size which requires the minimum necessary number according to said calculation result.

17. An apparatus as recited in claim 15, further comprising:

changing means for changing the position of said first image with respect to said second image.

18. An image editing apparatus used with an image forming apparatus forming an image on a plurality of sheets, comprising:

first recognize means for recognizing an image size of said image;

second recognize means for recognizing a sheet size used in said image forming apparatus;

calculating means for calculating a necessary number of sheets on which said image is reproduced based on the image information and the sheet information;

selecting means for selecting a sheet size which requires the minimum necessary number according to said calculation result;

display means for displaying a first image indicating the size of said plurality of sheets of selected sheet size and a second image indicating the size of said image; and control means for controlling said display means to overlap said first image and said second image on said display, wherein said selecting means selects the smallest sheet size if the calculation result concerning one sheet size is equal to that concerning other sheet sizes.

* * * * *